mber: US010638469B2

(12) United States Patent
Hosseini et al.

(10) Patent No.: US 10,638,469 B2
(45) Date of Patent: Apr. 28, 2020

(54) DATA TRANSMISSION IN A PHYSICAL DOWNLINK CONTROL CHANNEL

(71) Applicant: QUALCOMM Incorporated, San Diego, CA (US)

(72) Inventors: Seyedkianoush Hosseini, San Diego, CA (US); Wanshi Chen, San Diego, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/015,062

(22) Filed: Jun. 21, 2018

(65) Prior Publication Data

US 2018/0376464 A1    Dec. 27, 2018

Related U.S. Application Data

(60) Provisional application No. 62/524,280, filed on Jun. 23, 2017.

(51) Int. Cl.
*H04W 72/04* (2009.01)
*H04W 76/27* (2018.01)
(Continued)

(52) U.S. Cl.
CPC ......... *H04W 72/042* (2013.01); *H04L 1/1812* (2013.01); *H04L 1/1822* (2013.01);
(Continued)

(58) Field of Classification Search
CPC ... H04W 72/042; H04W 76/27; H04W 28/06; H04W 72/0446; H04L 1/1812; H04L 5/0044

See application file for complete search history.

(56) References Cited

U.S. PATENT DOCUMENTS

2015/0163771 A1   6/2015 Kim et al.
2017/0171842 A1*  6/2017 You .................... H04L 5/0048

FOREIGN PATENT DOCUMENTS

WO    WO-2018175397 A1    9/2018

OTHER PUBLICATIONS

"3rd Generation Partnership Project; Technical Specification Group Radio Access Network; Evolved Universal Terrestrial Radio Access (E-UTRA); Study on Latency Reduction Techniques for LTE (Release 14)", 3GPP Standard; Technical Report; 3GPP TR 36.881, 3rd Generation Partnership Project (3GPP), Mobile Competence Centre; 650, Route Des Lucioles; F-06921 Sophia-Antipolis Cedex; France, vol. RAN WG2, No. V14.0.0, Jul. 13, 2016, XP051450161, pp. 1-99.

(Continued)

*Primary Examiner* — Pao Sinkantarakorn
*Assistant Examiner* — Kabir U Jahangir
(74) *Attorney, Agent, or Firm* — Holland & Hart LLP

(57) ABSTRACT

Communications data having a reliability and latency threshold may be transmitted within a legacy downlink control channel. For example, a user equipment (UE) may utilize low latency services, such as ultra-reliable low latency communications (URLLC). In such cases, a base station may transmit URLLC data in a legacy physical downlink control channel (PDCCH) of a downlink transmission time interval. The UE may determine that the PDCCH includes downlink data. The downlink data may have a delay tolerance below the threshold level (e.g., URLLC data), and the determination may be based on a downlink control information (DCI) payload within the received PDCCH. The UE may then receive the downlink data within the PDCCH. In some examples, the downlink data may be received within the DCI payload. Additionally or alternatively, the DCI payload may provide an indication of resources within the PDCCH that are utilized for carrying the downlink data.

44 Claims, 18 Drawing Sheets

(51) Int. Cl.
H04L 5/00 (2006.01)
H04L 1/18 (2006.01)
H04W 28/06 (2009.01)

(52) U.S. Cl.
CPC .......... *H04L 1/1887* (2013.01); *H04L 5/0044* (2013.01); *H04L 5/0053* (2013.01); *H04L 5/0064* (2013.01); *H04L 5/0094* (2013.01); *H04W 76/27* (2018.02); *H04W 28/06* (2013.01); *H04W 72/0446* (2013.01)

(56) References Cited

OTHER PUBLICATIONS

Ericsson: "Multiplexing sPDCCH with sPDSCH/PDSCH," 3GPP Draft, R1-1708864, 3rd Generation Partnership Project (3GPP), Mobile Competence Centre, 650, Route Des Lucioles; F-06921 Sophia-Antipolis Cedex, France, vol. RAN WG1, Hangzhou, 20170515-20170519; May 14, 2017 (May 14, 2017), 6 Pages, XP051274047, Retrieved from the Internet: URL: http://www.3gpp.org/ftp/Meetings_3GPP_SYNC/RAN1/Docs/ [retrieved on May 14, 2017].

International Search Report and Written Opinion—PCT/US2018/039013—ISA/EPO—dated Oct. 12, 2018.

ZTE: "sPDCCH multiplexing with sPDSCH", 3GPP Draft; R1-1707278 SPDCCH Multiplexing With SPDSCH, 3rd Generation Partnership Project (3GPP), Mobile Competence Centre; 650, Route Des Lucioles; F-06921 Sophia-Antipolis Cedex; France, vol. RAN WG1, No. Hangzhou; 20170515-20170519 May 14, 2017, XP051272491, Retrieved from the Internet: URL:http://www.3gpp.org/ftp/Meetings_3GPP_SYNC/RAN1/Docs/ [retrieved on May 14, 2017], 3 pages.

* cited by examiner

DATA TRANSMISSION IN A PHYSICAL DOWNLINK CONTROL CHANNEL

CROSS REFERENCES

The present Application for Patent claims priority to U.S. Provisional Patent Application No. 62/524,280 by Hosseini et al., entitled "Data Transmission in a Physical Downlink Control channel for Data Communications with a Delay Tolerance Below a Threshold Level," filed Jun. 23, 2017, assigned to the assignee hereof, the entirety of which is hereby expressly incorporated by reference.

BACKGROUND

The following relates generally to wireless communication, and more specifically to data transmission in a downlink control channel, for example, including data communications with a delay tolerance below a threshold level.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

UEs within a wireless communications system may have different requirements based on particular applications or deployments. Systems may, therefore, be designed to support multiple wireless communication services. For example, a system may support wireless communication services with certain enhanced reliability and latency targets. However, resource configurations and certain legacy transmission restrictions, for example, may limit the system's ability to achieve such targets.

SUMMARY

The described techniques relate to improved methods, systems, devices, or apparatuses that support data transmission in a physical downlink control channel (PDCCH) for data communications with a delay tolerance below a threshold level. Generally, the described techniques provide for the transmission of communications data having certain reliability and latency thresholds within a downlink control channel. For example, a base station and user equipment (UE) may be in communication with each other, and the UE may support the use of low latency services, such as ultra-reliable low latency communications (URLLC). The base station may transmit a PDCCH of a downlink transmission time interval (TTI), and the UE may determine that the PDCCH includes downlink data. For example, the UE may be configured to receive the downlink data via a physical downlink shared channel (PDSCH) within a PDCCH region of the TTI. In some cases, the downlink data included in the PDCCH may have a delay tolerance below the threshold level (e.g., URLLC data), and the determination may be based on a downlink control information (DCI) payload within the received PDCCH. The UE may then receive the downlink data within the PDCCH. In some examples, the downlink data may be received within the DCI payload. Additionally or alternatively, the DCI payload may provide an indication of resources within the PDCCH that are utilized for carrying the downlink data.

A method of wireless communication is described. The method may include receiving a PDCCH of a downlink TTI, identifying, via a DCI payload of the PDCCH, that the PDCCH includes data communications having a first service configuration, and receiving the data communications within the PDCCH.

An apparatus for wireless communication is described. The apparatus may include means for receiving a PDCCH of a downlink TTI, means for identifying, via a DCI payload of the PDCCH, that the PDCCH includes data communications having a first service configuration, and means for receiving the data communications within the PDCCH.

Another apparatus for wireless communication is described. The apparatus may include a processor, memory in electronic communication with the processor, and instructions stored in the memory. The instructions may be operable to cause the processor to receive a PDCCH of a downlink TTI, identify, via a DCI payload of the PDCCH, that the PDCCH includes data communications having a first service configuration, and receive the data communications within the PDCCH.

A non-transitory computer readable medium for wireless communication is described. The non-transitory computer-readable medium may include instructions operable to cause a processor to receive a PDCCH of a downlink TTI, identify, via a DCI payload of the PDCCH, that the PDCCH includes data communications having a first service configuration, and receive the data communications within the PDCCH.

In some examples of the method, apparatus, and non-transitory computer-readable medium described above, receiving the data communications includes receiving the data communications within contents of the DCI payload. In some examples of the method, apparatus, and non-transitory computer-readable medium described above, receiving the data communications includes receiving, as part of a bit field of the DCI payload, an indication of downlink resources within the PDCCH on which the data communications may be to be received. Some examples of the method, apparatus, and non-transitory computer-readable medium described above may further include processes, features, means, or instructions for receiving the data communications in the downlink resources based on the received indication.

Some examples of the method, apparatus, and non-transitory computer-readable medium described above may further include processes, features, means, or instructions for receiving an indication of a set of control channel elements (CCEs) for receiving the data communications. Some examples of the method, apparatus, and non-transitory computer-readable medium described above may further include processes, features, means, or instructions for identifying a set of CCE groups (CCEGs). Some examples of the method, apparatus, and non-transitory computer-readable medium described above may further include processes, features, means, or instructions for receiving an indication of a set of CCEs of the CCEGs for receiving the data communications.

Some examples of the method, apparatus, and non-transitory computer-readable medium described above may further include processes, features, means, or instructions for identifying an index of the downlink TTI based on synchronous downlink transmissions, synchronous uplink transmissions, or both. Some examples of the method, apparatus, and non-transitory computer-readable medium described above may further include processes, features, means, or instructions for determining a hybrid automatic repeat request (HARQ) process identifier (ID), a redundancy version (RV), a new data indicator (NDI), or any combination thereof based on the identified index.

Some examples of the method, apparatus, and non-transitory computer-readable medium described above may further include processes, features, means, or instructions for identifying that the data communications may be included in a periodic transmission, the downlink TTI being associated with an initial transmission of the data communications. Some examples of the method, apparatus, and non-transitory computer-readable medium described above may further include processes, features, means, or instructions for determining a HARQ process ID and a RV for the initial transmission based on an index of the downlink TTI.

In some examples of the method, apparatus, and non-transitory computer-readable medium described above, the data communications having the first service configuration may include data communications with a delay tolerance below a threshold level.

Some examples of the method, apparatus, and non-transitory computer-readable medium described above may further include processes, features, means, or instructions for identifying a control format indicator (CFI) for a set of TTIs that includes the downlink TTI. Some examples of the method, apparatus, and non-transitory computer-readable medium described above may further include processes, features, means, or instructions for identifying the PDCCH based on the CFI.

In some examples of the method, apparatus, and non-transitory computer-readable medium described above, identifying that the PDCCH includes the data communications includes identifying a UE-specific radio network temporary identifier (RNTI) associated with a search space for a DCI format including the DCI payload, the UE-specific RNTI being different from a second RNTI associated with a search space for a different DCI format for different data communications having a second service configuration. Some examples of the method, apparatus, and non-transitory computer-readable medium described above may further include processes, features, means, or instructions for determining a starting location of the search space including the DCI payload based on the identified UE-specific RNTI.

In some examples of the method, apparatus, and non-transitory computer-readable medium described above, identifying that the PDCCH includes the data communications includes determining a first DCI size of a DCI format including the DCI payload that may be different from a second DCI size associated with a different DCI format for different data communications having a second service configuration. Some examples of the method, apparatus, and non-transitory computer-readable medium described above may further include processes, features, means, or instructions for identifying that the PDCCH includes the data communications based on the determined first DCI size.

In some examples of the method, apparatus, and non-transitory computer-readable medium described above, identifying that the PDCCH includes the data communications includes determining a first error checking encoding length of a DCI format including the DCI payload that may be different from a second error checking encoding length associated with a different DCI format for different data communications having a second service configuration. Some examples of the method, apparatus, and non-transitory computer-readable medium described above may further include processes, features, means, or instructions for identifying that the PDCCH includes the data communications based on the determined first error checking encoding length.

Some examples of the method, apparatus, and non-transitory computer-readable medium described above may further include processes, features, means, or instructions for determining a first aggregation level for a DCI format including the DCI payload that may be different from a second aggregation level associated with a different DCI format for different data communications having a second service configuration, where receiving the data communications may be based on the determined first aggregation level.

In some examples of the method, apparatus, and non-transitory computer-readable medium described above, the different data communications having the second service configuration may include data communications with a delay tolerance above a threshold level associated with the first service configuration.

In some examples of the method, apparatus, and non-transitory computer-readable medium described above, the first aggregation level may be a fixed aggregation level based on a payload size of the DCI format. Some examples of the method, apparatus, and non-transitory computer-readable medium described above may further include processes, features, means, or instructions for determining a payload size of a DCI format including the DCI payload. Some examples of the method, apparatus, and non-transitory computer-readable medium described above may further include processes, features, means, or instructions for decoding the data communications based on the determined payload size and an aggregation level of the DCI format.

Some examples of the method, apparatus, and non-transitory computer-readable medium described above may further include processes, features, means, or instructions for performing a blind decoding of the data communications based on a plurality of payload sizes and aggregation levels of a DCI format including the DCI payload. Some examples of the method, apparatus, and non-transitory computer-readable medium described above may further include processes, features, means, or instructions for receiving an indicator bit identifying a DCI format including the DCI payload as a DCI format that includes an indication of downlink resources for the data communications within the PDCCH.

Some examples of the method, apparatus, and non-transitory computer-readable medium described above may further include processes, features, means, or instructions for identifying an uplink TTI, where a timing of the uplink TTI may be based on receiving the data communications in the PDCCH of the downlink TTI. Some examples of the method, apparatus, and non-transitory computer-readable medium described above may further include processes, features, means, or instructions for transmitting HARQ feedback using the uplink TTI.

Some examples of the method, apparatus, and non-transitory computer-readable medium described above may further include processes, features, means, or instructions for receiving, within the PDCCH of the downlink TTI, a resource grant for uplink data communications having an uplink service configuration. Some examples of the method, apparatus, and non-transitory computer-readable medium described above may further include processes, features, means, or instructions for receiving a radio resource control (RRC) message including an indication of whether to monitor resources for URLLC or resources for ultra-low latency (ULL).

In some examples of the method, apparatus, and non-transitory computer-readable medium described above, the uplink data communications having an uplink service configuration may include uplink data communications with a delay tolerance below a threshold level.

Some examples of the method, apparatus, and non-transitory computer-readable medium described above may further include processes, features, means, or instructions for identifying a first RNTI and a second RNTI, the first RNTI being associated with an URLLC downlink control channel and the second RNTI being associated with a ULL downlink control channel. Some examples of the method, apparatus, and non-transitory computer-readable medium described above may further include processes, features, means, or instructions for identifying the downlink TTI as a URLLC resource or a ULL resource based on the identified first RNTI or second RNTI.

Some examples of the method, apparatus, and non-transitory computer-readable medium described above may further include processes, features, means, or instructions for receiving, as part of the DCI payload, an indication of a dynamic HARQ feedback timing for the data communications. Some examples of the method, apparatus, and non-transitory computer-readable medium described above may further include processes, features, means, or instructions for identifying the downlink TTI as an URLLC resource or an ULL resource based on the indication.

Some examples of the method, apparatus, and non-transitory computer-readable medium described above may further include processes, features, means, or instructions for determining a duration of the downlink TTI. Some examples of the method, apparatus, and non-transitory computer-readable medium described above may further include processes, features, means, or instructions for identifying the downlink TTI as an URLLC resource or an ULL resource based on the duration of the downlink TTI.

Some examples of the method, apparatus, and non-transitory computer-readable medium described above may further include processes, features, means, or instructions for identifying DCI payload parameters including at least a DCI payload aggregation level, a DCI payload size, or both. Some examples of the method, apparatus, and non-transitory computer-readable medium described above may further include processes, features, means, or instructions for identifying the downlink TTI as an URLLC resource or an ULL resource based on the DCI payload parameters.

A method of wireless communication is described. The method may include transmitting a DCI payload within a PDCCH of a downlink TTI and transmitting data communications having a first service configuration in the PDCCH, the DCI payload being indicative that the data communications are included in the PDCCH.

An apparatus for wireless communication is described. The apparatus may include means for transmitting a DCI payload within a PDCCH of a downlink TTI and means for transmitting data communications having a first service configuration in the PDCCH, the DCI payload being indicative that the data communications are included in the PDCCH.

Another apparatus for wireless communication is described. The apparatus may include a processor, memory in electronic communication with the processor, and instructions stored in the memory. The instructions may be operable to cause the processor to transmit a DCI payload within a PDCCH of a downlink TTI and transmit data communications having a first service configuration in the PDCCH, the DCI payload being indicative that the data communications are included in the PDCCH.

A non-transitory computer readable medium for wireless communication is described. The non-transitory computer-readable medium may include instructions operable to cause a processor to transmit a DCI payload within a PDCCH of a downlink TTI and transmit data communications having a first service configuration in the PDCCH, the DCI payload being indicative that the data communications are included in the PDCCH.

In some examples of the method, apparatus, and non-transitory computer-readable medium described above, transmitting the data communications includes transmitting the data communications within the DCI payload. In some examples of the method, apparatus, and non-transitory computer-readable medium described above, transmitting the data communications includes transmitting, as part of a bit field of the DCI payload, an indication of downlink resources within the PDCCH on which the data communications may be to be transmitted. Some examples of the method, apparatus, and non-transitory computer-readable medium described above may further include processes, features, means, or instructions for transmitting the data communications in the downlink resources based on the transmitted indication.

Some examples of the method, apparatus, and non-transitory computer-readable medium described above may further include processes, features, means, or instructions for transmitting an indication of a set of CCEs for receiving the data communications.

Some examples of the method, apparatus, and non-transitory computer-readable medium described above may further include processes, features, means, or instructions for identifying a set of CCEGs. Some examples of the method, apparatus, and non-transitory computer-readable medium described above may further include processes, features, means, or instructions for transmitting an indication of a set of CCEs of the CCEGs used for transmitting the data communications.

In some examples of the method, apparatus, and non-transitory computer-readable medium described above, transmitting the DCI payload includes determining a UE-specific RNTI corresponding to a DCI format including the DCI payload, the UE-specific RNTI being different from a second RNTI associated with a different DCI format for different data communications having a second service configuration. Some examples of the method, apparatus, and non-transitory computer-readable medium described above may further include processes, features, means, or instructions for transmitting the DCI payload within a UE-specific search space.

In some examples of the method, apparatus, and non-transitory computer-readable medium described above, transmitting the DCI payload includes determining a first error checking encoding length for a DCI format including the DCI payload that may be different from a second error checking encoding length associated with a different DCI format for different data communications having a second service configuration. In some examples of the method, apparatus, and non-transitory computer-readable medium described above, the method further including encoding the DCI format based on the determined first error checking encoding length.

Some examples of the method, apparatus, and non-transitory computer-readable medium described above may further include processes, features, means, or instructions for determining a first aggregation level for a DCI format including the DCI payload that may be different from a second aggregation level associated with a different DCI format for different data communications having a second service configuration, where the data communications may be transmitted based on the determined first aggregation level.

In some examples of the method, apparatus, and non-transitory computer-readable medium described above, the first aggregation level may be a fixed aggregation level based on a payload size of the DCI format. Some examples of the method, apparatus, and non-transitory computer-readable medium described above may further include processes, features, means, or instructions for transmitting an indicator bit identifying a DCI format including the DCI payload as a DCI format that includes an indication of downlink resources for the data communications within the PDCCH.

Some examples of the method, apparatus, and non-transitory computer-readable medium described above may further include processes, features, means, or instructions for receiving HARQ feedback based on transmitting the data communications in the PDCCH, where a HARQ process ID and RV are associated with an index of the downlink TTI. Some examples of the method, apparatus, and non-transitory computer-readable medium described above may further include processes, features, means, or instructions for transmitting, within the PDCCH of the downlink TTI, a resource grant for uplink data communications having an uplink service configuration.

Some examples of the method, apparatus, and non-transitory computer-readable medium described above may further include processes, features, means, or instructions for transmitting a RRC message including an indication of whether to monitor resources for URLLC or resources for ULL.

DETAILED DESCRIPTION

Figure 1:
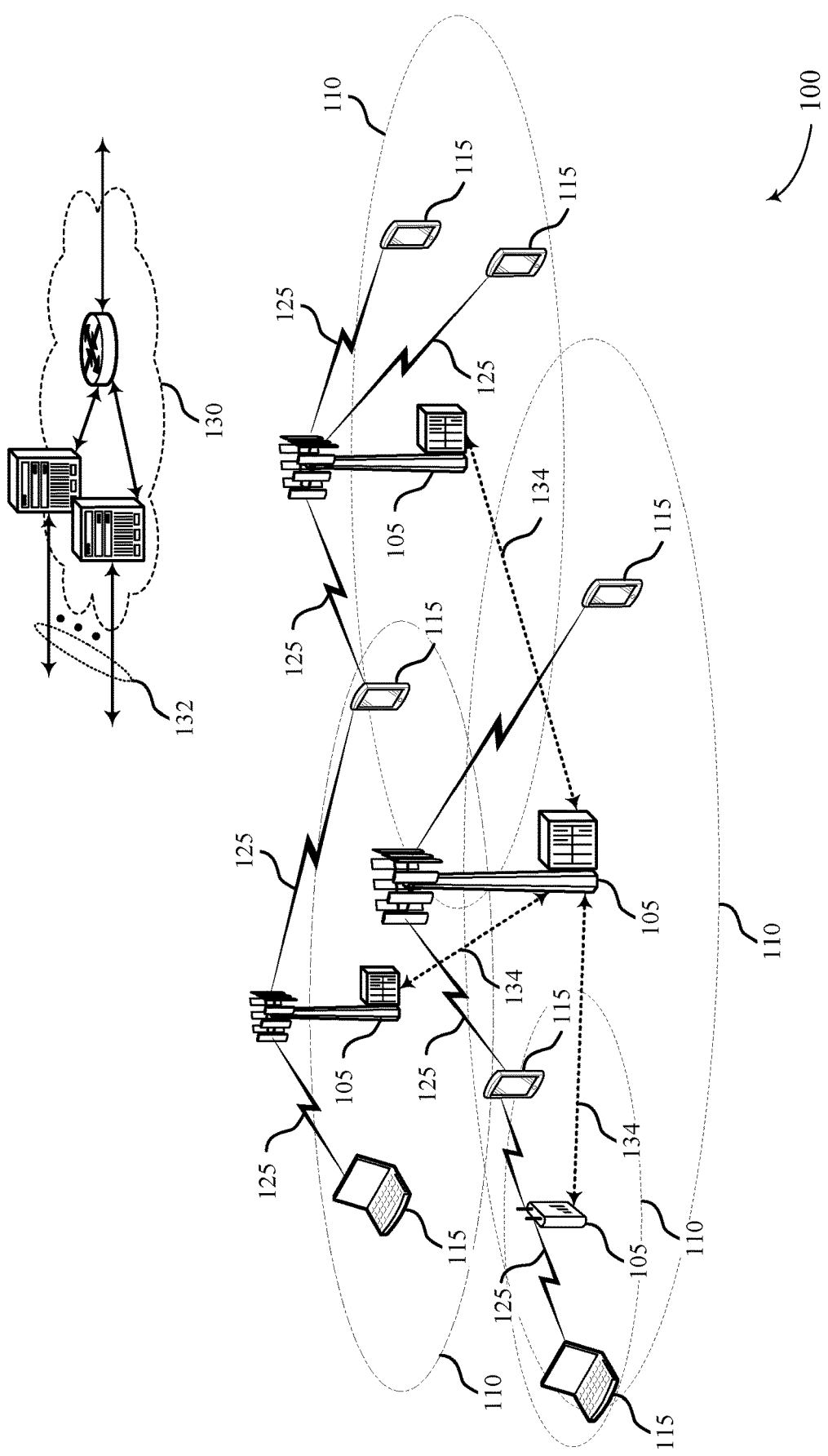
FIG. 1 illustrates an example of a system for wireless communication that supports data transmission in a physical downlink control channel (PDCCH) in accordance with aspects of the present disclosure.

Some wireless communications systems may be configured to satisfy certain reliability and latency targets. For example, a system may support low latency communications (e.g., ultra-low latency (ULL), ultra-reliable low latency communications (URLLC), and the like) between a user equipment (UE) and a base station to reduce latency of transmissions between devices. Such systems may be configured with enhanced timing resource allocations, enhanced transmission repetition schemes, enhanced feedback mechanisms, or a combination of these features, to achieve reliability and latency targets.

In some cases, a wireless communications system may support multiple configurations of transmission time intervals (TTIs) for transmitting in the downlink. In such cases, various TTIs may be used for a number of different communications services within the system (such as downlink data sent via a physical downlink shared channel (PDSCH)), including, for example, both URLLC and legacy services (such as non-low latency or non-URLLC services). Certain TTIs of a configuration may include a legacy control region designated for legacy control information, while URLLC data may be transmitted in one or more other TTIs of the same configuration. As a result, the legacy control information sent within a legacy control region of a TTI may result in unnecessary latency introduced to URLLC services. For example, unnecessary latency may be introduced when URLLC data may not be transmitted in the legacy control region.

However, as described herein, a wireless communications system may support the transmission of low latency data within a legacy or non-low latency control channel region of a TTI. For example, URLLC data may be received by a UE within a physical downlink control channel (PDCCH) region of a TTI that may otherwise be reserved for legacy control information. To maintain a latency target associated with low latency communications, a downlink control information (DCI) payload within the PDCCH region may be used to transmit low latency data or to indicate downlink resources used to transmit low latency data in the PDCCH region. For example, the content of a DCI payload may be used for the transmission of data communications with a delay tolerance below a threshold level instead of control information (e.g., for data communications having a relatively higher delay tolerance). In other examples, the DCI payload of a DCI format may include resource allocation information indicating downlink resources used to transmit the data communications within the PDCCH region. As an example, a DCI payload may be used to indicate a set of control channel elements (CCEs) for transmitting the data communications.

Aspects of the disclosure are initially described in the context of a wireless communications system. Further examples are also provided illustrating downlink TTIs that include a control channel region for transmitting low latency data. Aspects of the disclosure are further illustrated by and described with reference to apparatus diagrams, system diagrams, and flowcharts that relate to data transmission in a PDCCH for data communications with a delay tolerance below a threshold level.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support efficient communications with reduced latency through URLLC data communications sent in a legacy PDCCH region of a downlink TTI.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, S2). Base stations 105 may communicate with one another over backhaul links 134 (e.g., X1, X2) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as base station may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 5 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 25 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARM) to provide retransmission at the MAC layer to improve link efficiency. In the control plane, the radio resource control (RRC) protocol layer may provide establishment, configuration, and maintenance of an RRC connection between a UE 115 and a network device or core network 130 supporting radio bearers for user plane data. At the physical layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200$ $T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers (CCs) using short TTIs).

A resource element may consist of one symbol period and one subcarrier (e.g., a 15 kHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a CC, a layer, a channel, etc. The terms "carrier," "component carrier," "cell," and "channel" may be used interchangeably herein. A UE 115 may be configured with multiple downlink CCs and one or more uplink CCs for CA. CA may be used with both frequency division duplexing (FDD) and time division duplexing (TDD) CCs.

In some cases, wireless communications system 100 may utilize enhanced CCs (eCCs). An eCC may be characterized by one or more features including: wider bandwidth, shorter symbol duration, shorter TTIs, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds (μs)). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

PDCCH may carry DCI in CCEs, which may include nine logically contiguous resource element groups (REGs), where each REG contains 4 resource elements (REs). DCI may include information regarding downlink scheduling assignments, uplink resource grants, transmission scheme, uplink power control, HARQ information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI must include additional signaling information. DCI size and format depend on the amount of information as well as factors such as bandwidth, the number of antenna ports, and duplexing mode. PDCCH can carry DCI messages associated with multiple users, and each UE 115 may decode the DCI messages that are intended for it.

For example, each UE 115 may be assigned a cell radio network temporary identifier (C-RNTI) and cyclic redundancy check (CRC) bits attached to each DCI may be scrambled based on the C-RNTI. To reduce power consumption and overhead at the user equipment, a limited set of CCE locations can be specified for DCI associated with a specific UE 115. CCEs may be grouped (e.g., in groups of 1, 2, 4 and 8 CCEs), and a set of CCE locations in which the user equipment may find relevant DCI may be specified.

These CCEs may be known as a search space. The search space can be partitioned into two regions: a common CCE region or search space and a UE-specific (dedicated) CCE region or search space. The common CCE region is monitored by all UEs 115 served by a base station 105 and may include information such as paging information, system information, random access procedures and the like. The UE-specific search space may include user-specific control information. CCEs may be indexed, and the common search space may start from CCE 0. The starting index for a UE specific search space depends on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful. In some cases, such as described herein, PDCCH, and more specifically DCI, may be utilized for the transmission of PDSCH downlink data. In some cases, the downlink data included may be low latency downlink data (e.g., URLLC data). In such cases, data communications may be transmitted in DCI, or DCI may indicate resources within a PDCCH that include the data communications.

Communications between a base station 105 and a UE 115 may be performed using TTIs of different lengths, that may be reduced in length relative to other TTIs. In some examples, a reduced length TTI may be referred to as an sTTI. sTTIs may support low latency services (e.g., URLLC) that provide low latency with high reliability for wireless communications. In some cases, an sTTI may be defined as a TTI including one OFDM symbol, two OFDM symbols, a slot, and the like. Accordingly, an sTTI may be a subset of one or more subframes that correspond to non-low latency TTI subframes, or a subset of a longer TTI such as a slot-TTI.

Wireless communications system 100 may support the transmission of communications data having different service configurations. In some cases, the service configurations may correspond with certain reliability and latency thresholds within a downlink control channel. For example, a UE 115 may support the use of low latency services, such as URLLC, and a base station 105 may transmit a PDCCH of a downlink TTI (e.g., an sTTI). The UE may determine that the PDCCH includes downlink data having a first service configuration (i.e., having a delay tolerance below the threshold level (e.g., URLLC data)), where the determination may be based on a DCI payload within the received PDCCH. In some cases, the identification of the downlink data may be based on a corresponding service configuration. In any event, the UE 115 may then receive the downlink data within the PDCCH (e.g., via PDSCH within the PDCCH). In some examples, the downlink data may be received within the DCI payload. Additionally or alternatively, the DCI payload may provide an indication of resources within the PDCCH that are utilized for carrying the downlink data. Thus, URLLC data may be sent to the UE 115 using a PDCCH otherwise used for the transmission of control information (e.g., legacy control information).

Figure 2:
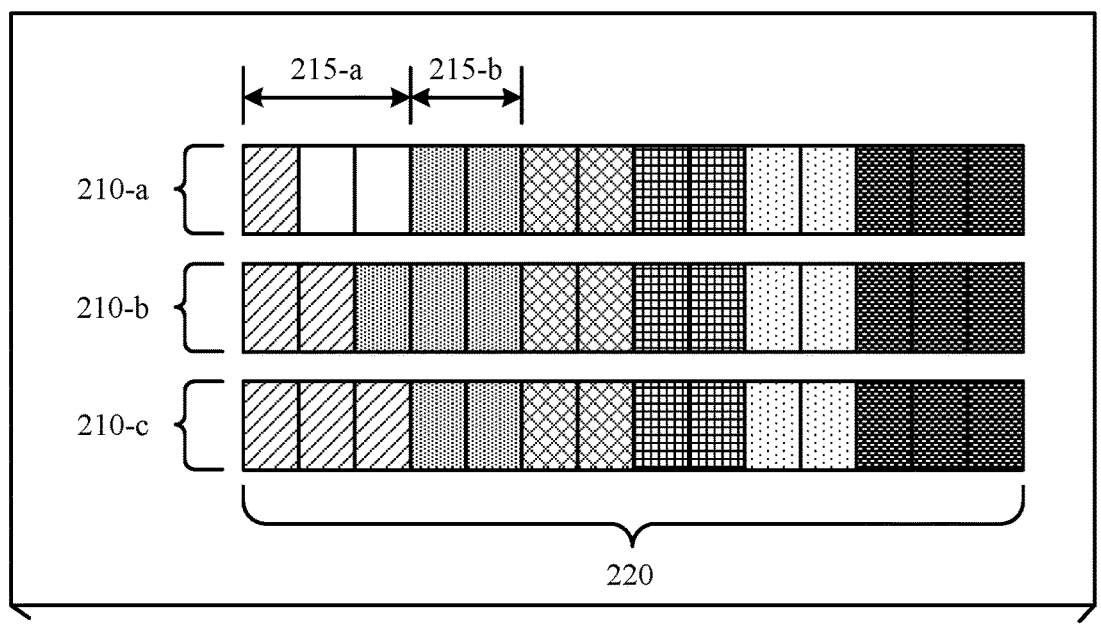
FIG. 2 illustrates an example of a wireless communications system that supports data transmission in a PDCCH in accordance with aspects of the present disclosure.
Figure 2:
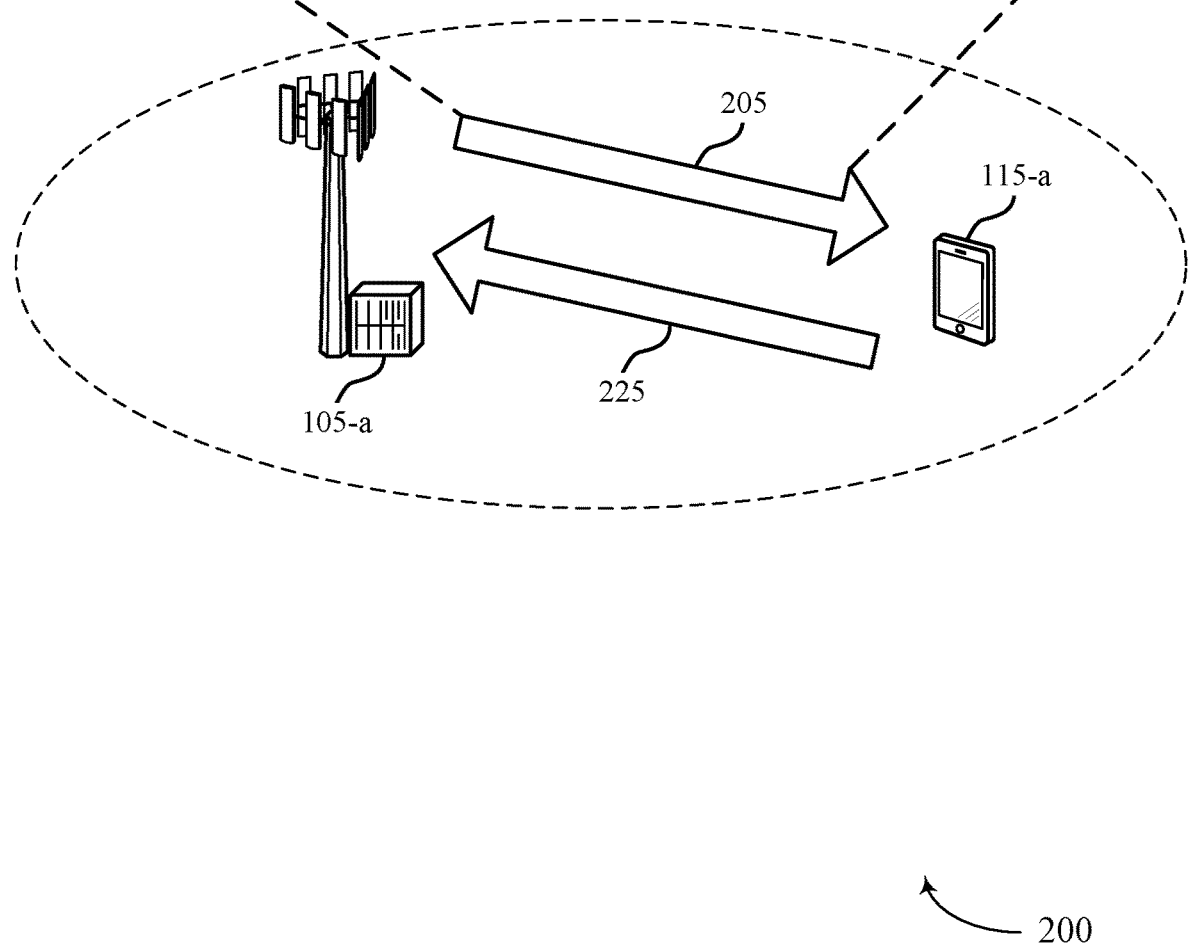

FIG. 2 illustrates an example of a wireless communications system 200 that supports data transmission in a PDCCH in accordance with various aspects of the present disclosure. In some examples, wireless communications system 200 may implement aspects of wireless communications system 100. For example, wireless communications system 200 includes UE 115-*a* and base station 105-*a*, which may be examples corresponding to devices as described with reference to FIG. 1. In the example of FIG. 2, wireless communications system 200 may support communications services with different service configurations. In some cases, the service configurations may correspond to reliability and latency targets. In some cases, wireless communications system 200 may support communications of a first service configuration with enhanced reliability and latency targets. Further, wireless communications system 200 may support the use of a control channel associated with legacy transmissions for transmitting data in order to achieve efficient low latency data communications.

Wireless communications system 200 may be configured to satisfy certain reliability and latency targets. For example, wireless communications system 200 may support low latency communications (e.g., ULL and URLLC) between UE 115-a and base station 105-a to reduce latency of communications. Further, wireless communications system 200 may be configured with enhanced timing resource allocations, enhanced transmission repetition schemes, enhanced feedback mechanisms, or a combination of these features, to achieve certain reliability and latency targets. As an example, URLLC services may have predetermined latency specifications for data transmissions between UE 115-a and base station 105-a (e.g., data transmissions with a target delay of 1 ms).

Base station 105-a may send downlink transmissions via a PDSCH to UE 115-a over downlink communication link 205. In some cases, wireless communications system 200 may support multiple TTI configurations 210 for a subframe 220 sent over downlink communication link 205. For example, base station 105-a may allocate time and frequency resources for communication with UE 115-a over downlink communication link 205, where the TTIs used for communications data may be transmitted in accordance with various downlink TTI configurations 210. In some cases, different TTI configurations 210 may be differentiated by a control format indicator (CFI). As an illustrative example, downlink TTI configurations 210-a, 210-b, and 210-c may be representations of TTI configurations 210 when the CFI is zero, one, and two, respectively (e.g., CFI0, CFI1, and CFI2). Additionally or alternatively, a TTI configuration 210 may be determined based on a number of control symbols used in a control channel region (e.g., a PDCCH).

Each TTI configuration 210 may include a set of sTTIs 215 (e.g., six sTTIs 215) and may specify a duration of specific sTTIs 215 (i.e., a number of OFDM symbols of each sTTI 215). For example, in first TTI configuration 210-a (e.g., corresponding to CFI0), first sTTI 215-a may have a duration of three symbols and second sTTI 215-b may have a duration of two symbols. In another example, second TTI configuration 210-b may be configured such that a first sTTI 215-a may have a duration of two symbols and a second sTTI 215-b may have a duration of three symbols, and so forth. In some cases, each TTI configuration 210 may represent a subframe 220. In some examples, subframe 220 may correspond to a legacy LTE TTI with a duration of 1 ms and may include 14 OFDM symbols (for a normal cyclic prefix).

In some examples, a control channel region of an sTTI 215 may be reserved for transmitting control information for legacy communications schemes (e.g., non-URLLC communications schemes). For example, a control channel region of first sTTI 215-a may be reserved for PDCCH associated with a wireless service or service type (e.g., a legacy wireless service) other than a low latency service (e.g., URLLC). The duration (i.e., a number of symbols) of the control channel region may be configured through the CFI. For example, as illustrated in downlink TTI configuration 210-a, when the CFI is zero, the duration the control channel region may be one symbol. As illustrated in downlink TTI configuration 210-b, when the CFI is one, the duration of the control channel region may be two symbols. Similarly, as illustrated in downlink TTI configuration 210-c, when the CFI is two, the duration of the control channel region may be three symbols.

In some examples, such as when the CFI is one or two, wireless communications system 200 may restrict downlink low latency data from being transmitted during first sTTI 215-a. For example, a control channel region of a first sTTI 215-a may be reserved for legacy PDCCH transmissions. However, in accordance with aspects of the present disclosure, when the CFI is set to one or two (i.e., CFI=1 or CFI=2), wireless communications system 200 may be configured to transmit low latency data within a legacy or non-low latency control channel region of a first sTTI 215-a. For example, URLLC data may be received by UE 115-a within a legacy PDCCH region of first sTTI 215-a that may otherwise be reserved for control information.

To maintain a reduction in delays associated with low latency communications data sent via the PDSCH, a DCI payload may be used to transmit low latency data or, as described in further detail below, to indicate downlink resources used to transmit low latency data in a control channel region of an sTTI 215. For example, the content of a DCI payload may be used for the transmission of low latency data (e.g., data having a first service configuration) instead of control information for data communications having a relatively higher delay tolerance (e.g., data communications having a second service configuration). That is, low latency data may be received by UE 115-a using a DCI format that is different from a legacy or non-low latency DCI format, where the low latency data is received in a legacy control region of the DCI format. In some examples, a DCI size associated with the DCI format used for transmitting low latency data may be the same as or different from the size of a legacy or non-low latency DCI format. In other cases, the DCI payload may be a DCI format that includes resource allocation information indicating downlink resources within a control channel region of an sTTI 215 where low latency data is located. As an example, a DCI payload may be used to indicate a set of CCEs used for transmitting low latency data, and UE 115-a may use the indication to receive the low latency data in the indicated CCEs. Accordingly, when downlink communications data for low latency services is sent over a control region associated with the higher delay tolerance, the downlink communications data structure may be based on a same structure as the control channel region (e.g., based on REGs and CCEs).

A DCI payload supporting low latency data transmission in a control channel region of an sTTI 215 may be differentiated from other DCI payloads. For example, UE 115-a may be capable of supporting URLLC and may monitor grants for 1 millisecond (ms) TTIs as well as grants for URLLC. Therefore, to facilitate efficient communications, a DCI payload including low latency data transmissions in a control channel region of a first sTTI 215-a may be differentiated from other DCI payloads. In one example, a UE-specific RNTI may indicate a location of a DCI payload used for low latency data transmission (e.g., obtain an index of a first CCE of a search space). In another example, a DCI payload supporting low latency data transmission may have a different size than a DCI payload that does not support low latency data transmission (e.g., a URLLC data payload may not be the same size as the payload of other DCI payloads). In yet another example, error checking encoding lengths (e.g., CRC lengths) may be used to differentiate DCIs. For example, a first CRC length may be used for a DCI payload that supports a low latency data transmission and a second, different, CRC length may be used for a DCI structure that does not support a low latency data transmission (e.g., a 24-bit CRC for a DCI structure used in URLLC applications and a 16 bit CRC for other DCIs). Additionally or alternatively, in cases where the DCI payload provides resource allocation information for a low latency data transmission in a control channel region, an indicator bit (i.e., a flag) may be used to differentiate DCI payloads.

Different aggregation levels may be used to facilitate low latency data transmission in a control channel region of a first sTTI 215-a. In some cases, a packet size used for low latency data transmissions in the control channel region may be larger than that of other DCIs (e.g., that do not carry low latency data). To achieve low coding rates, higher aggregation levels may be used (e.g., 16, 32, etc.). For example, aggregation levels 1, 2, 4, or 8 CCEs may be used for DCI formats associated with legacy control transmissions within an sTTI 215. However, to support low latency data transmissions, it may be beneficial to use aggregation levels of 16 or 32 CCEs (i.e., higher aggregation levels). In other cases, UE 115-a may be configured (e.g., using higher layer signaling, such as an RRC message) to search for low latency data using one or more different aggregation levels. For example, an aggregation level may be used for UE 115-a with low processing power or for services with certain delay requirements, enabling UE 115-a to perform only one decoding attempt. Additionally or alternatively, an aggregation level may be fixed based on a payload size of a DCI payload.

UE 115-a may be configured to decode low latency data received in a control channel region of an sTTI 215 using different techniques. In some cases, an aggregation level and payload size may be known to UE 115-a (e.g., the payload may be of a fixed size, such as in industrial applications). For example, an aggregation level and payload size may be predetermined or indicated through signaling. UE 115-a may use information of the aggregation level and payload size to infer a coding rate of a low latency data transmission and perform decoding operations. In other cases, UE 115-a may not know an aggregation level or payload size used for low latency data transmission (e.g., multiple aggregation levels or payload sizes may be possible). In such cases, UE 115-a may be configured to perform multiple blind decodes, for example, assuming different aggregation levels and payload sizes.

A DCI format may be used to indicate an allocation of resources used for transmitting low latency data within a control channel region of an sTTI 215. For example, a DCI payload may contain information (e.g., within a bit field) regarding resources used for low latency data transmission in a PDCCH (e.g., an indication of a location of resources). In some cases, in addition to resource allocation information, the DCI payload may include information for UE 115-a to use for decoding low latency data (e.g., information of an MCS, a HARQ process ID, a redundancy version (RV), etc.). For example, a number of bits may be used to provide information to UE 115-a to decode an URLLC PDSCH.

A DCI payload may indicate resources allocated for downlink data transmission in a control channel region of an sTTI 215 at a CCE level. In some cases, CCEs not used to send control information to other UEs 115 (not shown) may be used to transmit low latency data to UE 115-a. Accordingly, a resource allocation field of a DCI payload may indicate which CCEs are used for low latency data transmission (e.g., using a bitmap). In other cases, CCE groups (CCEGs) (i.e., groups of one or more CCEs) may be defined, and a DCI structure may include an indication of whether CCEs within a CCE group are used for low latency data transmission. For example, a resource allocation field of a DCI payload may include a bitmap where each bit indicates whether CCEs in a corresponding CCEG are used for low latency data transmission. In some cases, a semi-static CCEG size may be indicated by base station 105-a through higher layer signaling (e.g., an RRC message). Additionally or alternatively, grouping CCEs in CCEGs may reduce control overhead.

A HARQ process ID may be determined by UE 115-a using different techniques. For example, a HARQ process ID may be identified through the use of synchronous downlink transmissions, synchronous uplink transmissions (or both) when low latency data is included within the control channel resources, and UE 115-a may be able to infer a HARQ process ID and an RV from a transmission time of a first downlink transmission (e.g., an index of an sTTI 215). In cases with constant inter-arrival time, UE 115-a may transmit with a configured periodicity using uplink communications link 225 (e.g., a predetermined periodicity or a periodicity signaled by base station 105-a). Accordingly, the HARQ process ID for a first downlink transmission may be based on an index of an sTTI 215 or partial sTTI 215 (i.e., a one-symbol sTTI 215). In some cases, a low latency data transmission may not be included in a legacy control region within an sTTI 215, and therefore, an indication of an associated uplink sTTI for HARQ feedback transmitted on uplink communications link 225 may not be defined. In other cases, an uplink sTTI for HARQ feedback may be based on HARQ timing (e.g., n+4) for the communications data sent in the control region. In another example, a DCI format that schedules low latency data transmissions within a legacy control region may include an indication of HARQ information (e.g., HARQ process ID, NDI, RV, etc.) and UE 115-a may use the indication for HARQ feedback.

In some cases, URLLC grants may be differentiated from ULL grants using different techniques. In one example, UE 115-a may be configured to receive either URLLC or ULL grants by higher level signaling transmitted by base station 105-a. For example, UE 115-a may support both URLLC and ULL, however, an RRC message may be used to indicate to UE 115-a to monitor for one type of resource grant (i.e., either ULL or URLLC). In another example, different RNTIs associated with a short PDCCH (sPDCCH) grant may be used for differentiation. In such cases, a first RNTI may correspond to a URLLC grant and a second, different, RNTI may correspond to an ULL grant. In some examples, the type of grant may correspond to dynamic HARQ timing indicated in a DCI format (e.g., n+4 for ULL and n+2 for URLLC). Accordingly, UE 115-a may infer whether a grant is for URLLC or ULL based on the indicated dynamic HARQ timing. URLLC and ULL grants may also be differentiated through an indication of a dynamic length of an sTTI 215 (i.e., a symbol duration). As an example, a first length (e.g., 1 symbol) may correspond to a URLLC grant and a second length (e.g., 2 or 3 symbols) may correspond to a ULL grant. In yet another example, DCI parameters (e.g., parameters for decoding DCI) may be used to differentiate grants. For example, different aggregation levels, DCI payload sizes, etc. may correspond to either a URLLC grant or ULL grant.

An uplink grant for low latency communications (e.g., URLLC) may also be included in a control channel region of an sTTI 215. For example, in addition to low latency data, an uplink grant for low latency communications (e.g., uplink data communications having an uplink service configuration) may also be included in a control channel region of an sTTI 215 (e.g., within a PDCCH). In such cases, a DCI payload may indicate resources (e.g., in a subsequent sTTI 215) UE 115-*a* can use for low latency uplink transmissions. In such cases, sending an uplink grant for low latency communications in a non-low latency control channel region may reduce uplink latency.

Figure 3:
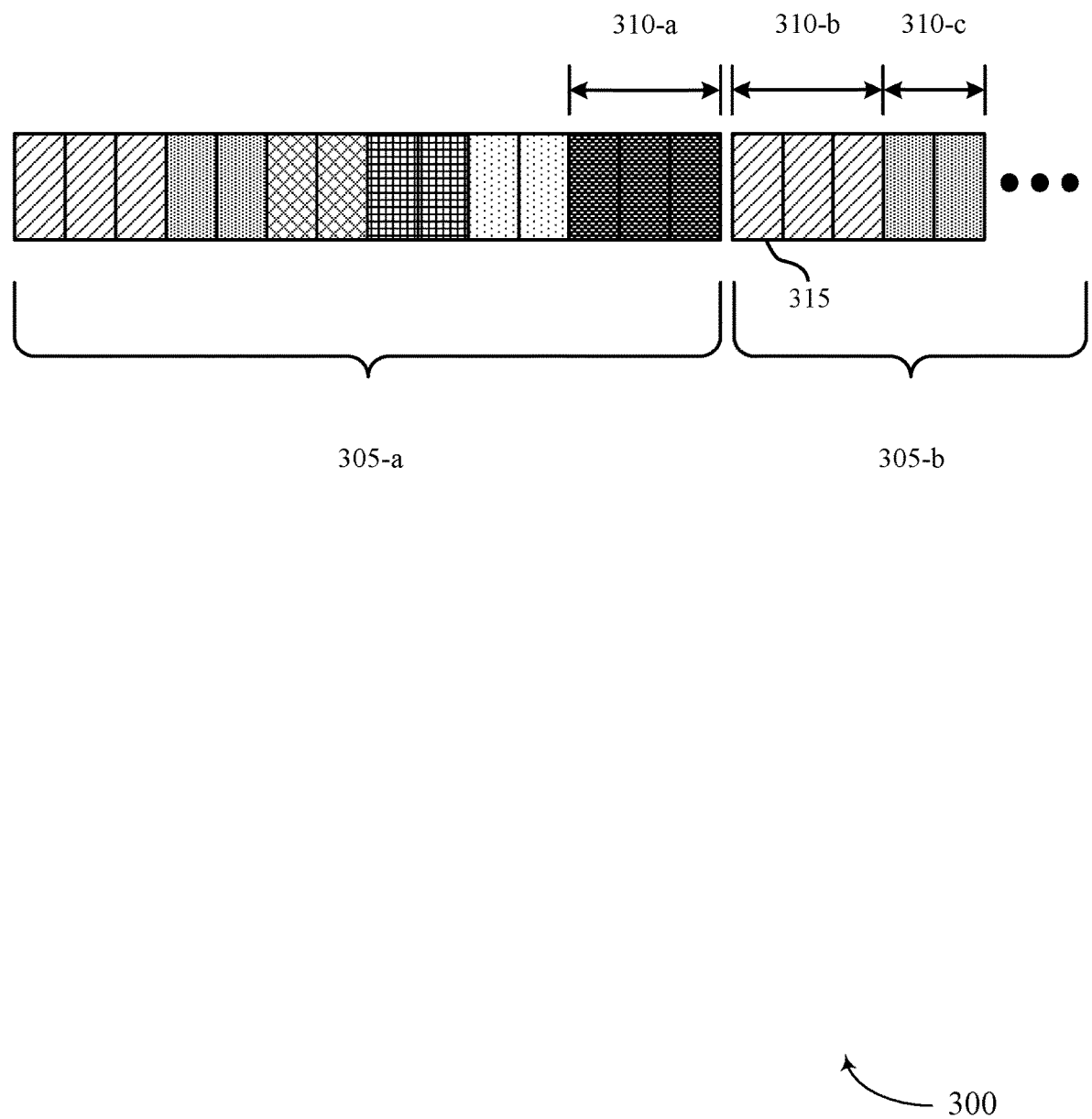
FIG. 3 illustrates an example of downlink transmission time intervals (TTIs) in a system that supports data transmission in a PDCCH in accordance with aspects of the present disclosure.

FIG. 3 illustrates an example of downlink TTIs 300 in a system that supports data transmission in a PDCCH in accordance with various aspects of the present disclosure. In some examples downlink TTIs 300 may implement aspects of wireless communications system 100. For example, downlink TTIs 300 may be an example of sTTIs having durations of two to three OFDM symbols. Downlink TTIs 300 may be an example of an allocation of time resources used by a base station 105 for transmissions to a UE 115. Additionally, downlink TTIs 300 may support the transmission of data communications having a delay tolerance below a certain threshold in a control channel region of an sTTI.

Downlink TTIs 300 illustrate an example of the configuration of two subsequent downlink subframes 305. As an example, downlink TTIs 300 include a first subframe 305-*a* and second subframe 305-*b*, where each downlink subframe 305 may include a predetermined number of symbols (e.g., 14 symbols) and be divided into a set of sTTIs 310 (e.g., 6 sTTIs 310). Each sTTI 310 may have a duration (e.g., a number of OFDM symbols) determined by a CFI or may be determined based on a number of control symbols 315 used in a control channel region (e.g., a PDCCH).

In some cases, a wireless communications system may not be configured to receive downlink data carried by a PDSCH over a control channel region. For example, a device in a wireless communications system (e.g., a UE 115) may not receive URLLC data over a legacy PDCCH, resulting in the URLLC data being transmitted in a later sTTI 310 (e.g., sTTI 310-*c*) following the control channel region, which may lead to an increased latency for downlink URLLC data. As an illustrative example, a low latency data packet may be available to transmit during sTTI 310-*a* of first subframe 305-*a*. However, the low latency data packet may not be sent until a second sTTI 310-*c* of second subframe 305-*b* because sTTI 310-*b* of second subframe 305-*b* may include a control channel region, and transmission of the low latency data packet may not be supported over this control channel region (e.g., in a PDCCH). Thus, latency may be reduced in cases where low latency data transmissions are supported for a control channel region of sTTI 310-*b*.

In some cases, sTTIs 310 may support low latency services that provide low latency with high reliability for wireless communications (e.g., URLLC). In such cases, data communications sent via a PDSCH with a delay tolerance below a threshold level (e.g., data communications having a first service configuration) may be transmitted by a base station 105 and received by a UE 115 in a control channel region of sTTI 310-*b* of a subframe 305. For example, the data communications may be transmitted in control symbols 315 using a DCI payload. In some cases, a DCI format may include data communications in the contents of the DCI payload instead of including legacy control information. That is, low latency data may be received by a UE 115 within the DCI payload. In other cases, the DCI payload may have a DCI format that includes resource allocation information, indicating downlink resources within a control channel region where the data communications are located. As an example, a DCI payload may be used to indicate, as part of a bit field, a set of CCEs within sTTI 310-*b* used for transmitting URLLC data, and a UE 115 may use the indication to receive the URLLC data in the indicated CCEs.

To facilitate data communications with low delay tolerance in a control channel region of sTTI 310-*b* of a subframe 305, different aggregation levels may be used. In some cases, a packet size used for the data communications may be larger than that of other DCI structures. To achieve low coding rates, higher aggregation levels may be used (e.g., 16, 32, etc.) for allocating data in a control symbol 315. For example, aggregation levels of 1, 2, 4, and 8 CCEs may typically be used in a legacy control channel (e.g., a legacy PDCCH within sTTI 310-*b*), however, to support low latency data transmissions, it may be beneficial to use aggregation levels of 16 or 32 CCEs. In other cases, a UE 115 may be configured (e.g., using higher layer signaling such as an RRC message) to search for the data communications in control symbols 315 using one or more different aggregation levels. Additionally or alternatively, an aggregation level for data communications within control symbols 315 may be fixed based on a payload size of a DCI payload.

Figure 4:
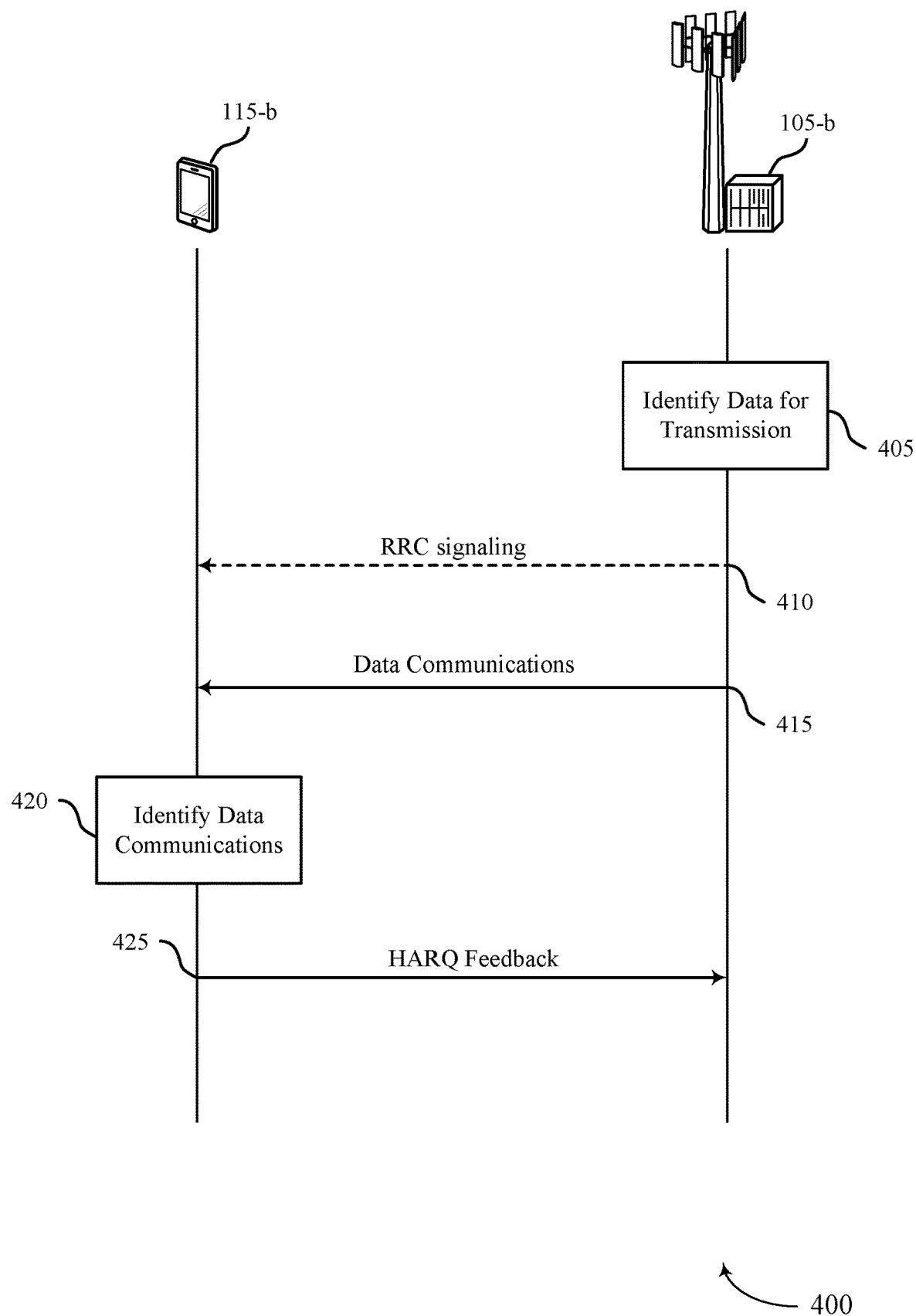
FIG. 4 illustrates an example of a process flow that supports data transmission in a PDCCH in accordance with aspects of the present disclosure.

FIG. 4 illustrates an example of a process flow 400 that supports data transmission in a PDCCH in accordance with various aspects of the present disclosure. In some examples, process flow 400 may implement aspects of wireless communications system 100. For example, process flow 400 includes a UE 115-*b* and base station 105-*b*, which may be examples of the corresponding devices as described with reference to FIGS. 1 and 2. Process flow 400 may illustrate an example of transmissions sent by base station 105-*b* and received by UE 115-*b* that include URLLC data within a legacy control region within an sTTI (e.g., in a PDCCH).

At 405, base station 105-*b* may identify low latency data for transmission to UE 115-*b*. For example, base station 105-*b* may determine to transmit URLLC data to UE 115-*b* in a control channel region that is typically reserved for control information for non-low latency communications (or data communications with a delay tolerance above a threshold level). To reduce latency of communications, base station 105-*b* may identify CCEs not used to send control information to other UE 115 and determine to use the identified CCEs for low latency data transmission to UE 115-*b*.

At 410, base station 105-*b* may optionally transmit higher layer signaling to UE 115-*b* (e.g., a RRC message), for example, base station 105-*b* may use higher layer signaling to configure UE 115-*b* to search for low latency data using one or more different aggregation levels. In another example, a semi-static CCEG size may be indicated by base station 105-*a* through higher layer signaling (e.g., an RRC message). Additionally or alternatively, base station 105-*b* may send higher layer signaling to UE 115-*b* to indicate to UE 115-*b* to monitor a certain type of resource grant (e.g., a ULL or URLLC resource grant).

At 415, base station 105-*b* may transmit, and UE 115-*b* may receive, data communications with a delay tolerance below a threshold level (e.g., URLLC data) to UE 115-*b* in the PDCCH of a downlink subframe. For example, UE 115-*b* may receive a PDCCH of a downlink TTI, which may include a DCI payload. The DCI payload may be used to transmit low latency data or indicate downlink resources used to transmit the low latency data in a control channel region. In some cases, low latency data may be received by UE 115-*b* within a DCI payload. In such cases, the DCI payload may have a DCI format that includes low latency data in a payload instead of including control information. In other cases, the DCI payload may have a format that includes resource allocation information, indicating to UE 115-*b*, downlink resources within a control channel region where low latency data is located. As an example, the DCI payload may be used by base station 105-*b* to indicate a set of CCEs used for transmitting the data communications, and UE 115-*b* may use the indication to receive the data communications in the indicated CCEs.

At 420, UE 115-*b* may identify low latency data transmitted by base station 105-*b*. For example, UE 115-*b* may identify the data communications transmitted by base station 105-*b* via a DCI payload, or may use a DCI structure to identify the downlink resources used for the data communications. For example, a DCI payload may indicate to UE 115-*b* a set of CCEs used to transmit low latency data, and UE 115-*b* may use the indication to identify the data communications transmitted in the PDCCH by base station 105-*b*.

UE 115-*b* may decode the identified data communications transmitted by base station 105-*b*. For example, UE 115-*b* may use a known aggregation level and payload size to assist in decoding low latency data. In some cases, an aggregation level and payload size may be predetermined or indicated through signaling by base station 105-*b*. As an example, UE 115-*b* may use information of the aggregation level and payload size to infer a coding rate of the data communications transmission and perform decoding operations. In other cases, UE 115-*b* may not know an aggregation level or payload size used for low latency data transmission (e.g., multiple aggregation levels or payload sizes may be possible). In such cases, UE 115-*b* may be configured to perform multiple blind decodes assuming different aggregation levels and payload sizes.

At 425, UE 115-*b* may transmit HARQ feedback to base station 105-*b*. For example, UE 115-*b* may transmit synchronous HARQ feedback at a predetermined time interval based on receiving the data communications in the PDCCH. Additionally or alternatively, UE 115-*b* may identify that the data communications are included in a periodic transmission, where the downlink TTI is associated with an initial transmission of the data communications. UE 115-*b* may then determine a HARQ process ID for the initial transmission based on an index of the downlink TTI. In some cases, the HARQ process ID that UE 115-*b* uses to transmit HARQ feedback to base station 105-*b* may be indicated to UE 115-*b* by base station 105-*b* (e.g., using higher layer signaling at 410) or may be inferred by UE 115-*b* based on a transmission time of a downlink transmission.

Figure 5:
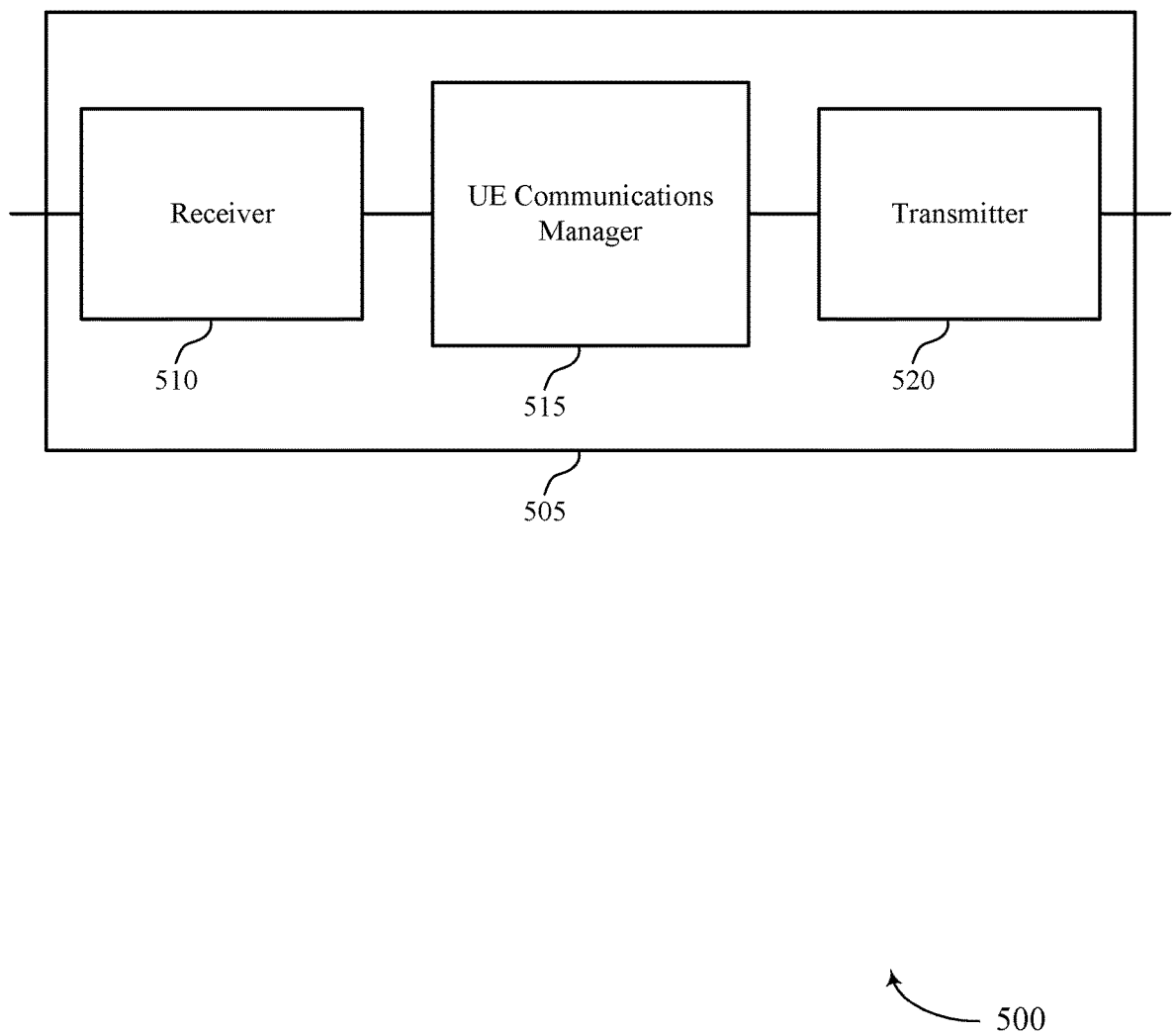
FIGS. 5 through 7 show block diagrams of a device that supports data transmission in a PDCCH in accordance with aspects of the present disclosure.

FIG. 5 shows a block diagram 500 of a wireless device 505 that supports data transmission in a PDCCH in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to data transmission in a PDCCH for data communications with a delay tolerance below a threshold level). Information may be passed on to other components of the device. The receiver 510 may be an example of aspects of the transceiver 835 described with reference to FIG. 8. The receiver 510 may utilize a single antenna or a set of antennas.

UE communications manager 515 may be an example of aspects of the UE communications manager 815 described with reference to FIG. 8. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may receive a PDCCH of a downlink TTI, identify, via a DCI payload of the PDCCH, that the PDCCH includes data communications having a first service configuration, and receive the data communications within the PDCCH. In some cases, data communications having the first service configuration may include data communications with a delay tolerance below a threshold level.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
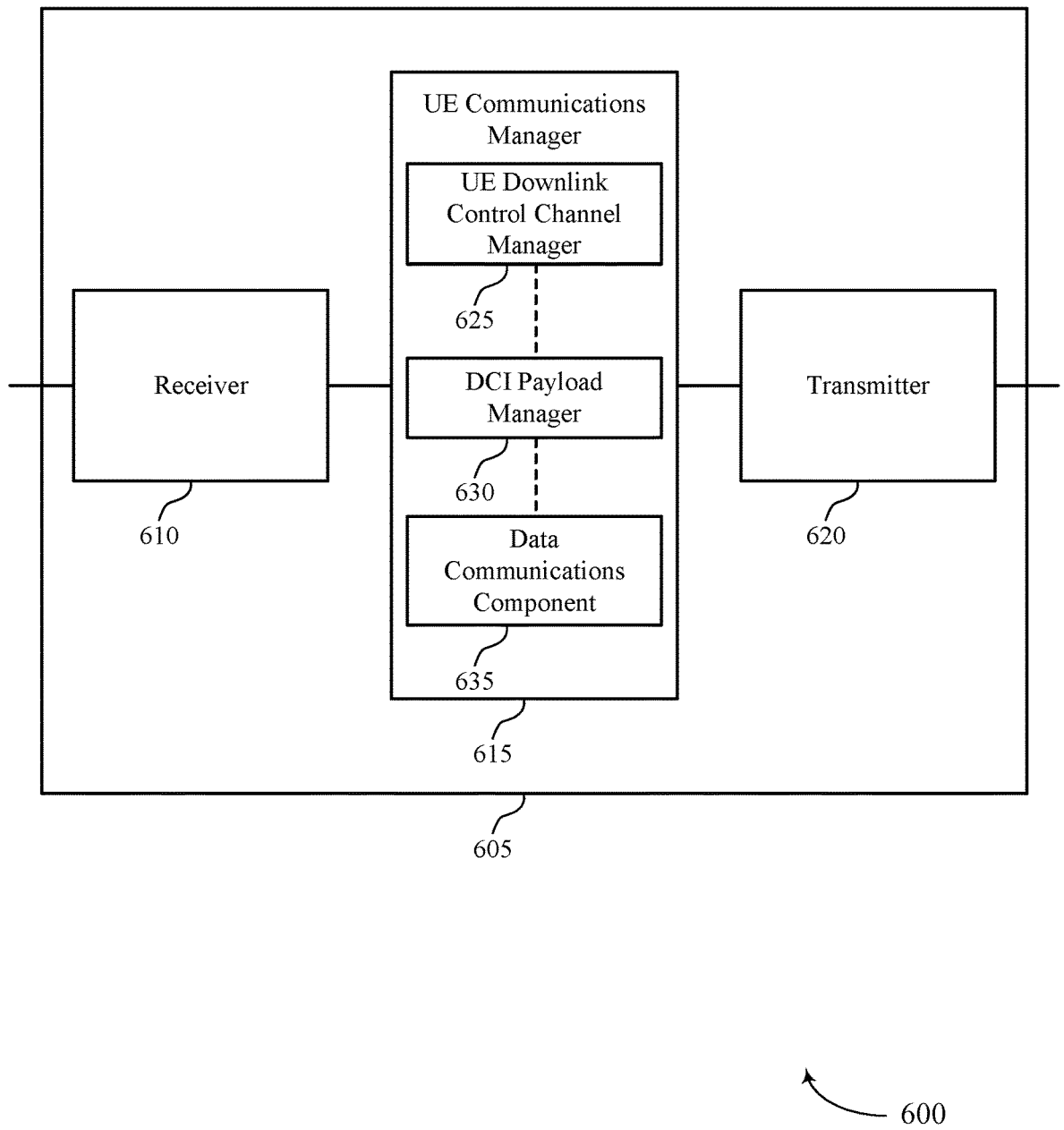

FIG. 6 shows a block diagram 600 of a wireless device 605 that supports data transmission in a PDCCH in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to data transmission in a PDCCH for data communications with a delay tolerance below a threshold level, etc.). Information may be passed on to other components of the device. The receiver 610 may be an example of aspects of the transceiver 835 described with reference to FIG. 8. The receiver 610 may utilize a single antenna or a set of antennas.

UE communications manager 615 may be an example of aspects of the UE communications manager 815 described with reference to FIG. 8. UE communications manager 615 may also include UE downlink control channel manager 625, DCI payload manager 630, and data communications component 635.

UE downlink control channel manager 625 may receive a PDCCH of a downlink TTI, identify the PDCCH based on the CFI, and, in some cases, determine a duration of the downlink TTI. DCI payload manager 630 may identify, via a DCI payload of the PDCCH, that the PDCCH includes data communications with a delay tolerance below a threshold level. In some examples, DCI payload manager 630 may identify DCI payload parameters including at least a DCI payload aggregation level, a DCI payload size, or both. In some cases, DCI payload manager 630 may determine a starting location of the search space including the DCI payload based on a UE-specific RNTI.

In some cases, DCI payload manager 630 may identify that the PDCCH includes the data communications based on a first DCI size, or may identify that the PDCCH includes the data communications based on a first error checking encoding length. Additionally or alternative, DCI payload manager 630 may determine a first aggregation level for a DCI format including the DCI payload that is different from a second aggregation level associated with a different DCI format for different data communications having a second service configuration, where receiving data communications is based on the determined first aggregation level. In some cases, data communications having the first service configuration may include data communications with a delay tolerance below a threshold level. In some examples, DCI payload manager 630 may determine a payload size of the DCI format including the DCI payload.

In some examples, identifying that the PDCCH includes the data communications may include determining a first DCI size of the DCI format including the DCI payload that is different from a second DCI size associated with a different DCI format for different data communications having a second service configuration. Additionally or alternatively, identifying that the PDCCH includes the data communications may include identifying a UE-specific RNTI associated with a search space for the DCI format including the DCI payload, the UE-specific RNTI being different from a second RNTI associated with a search space for a different DCI format for different data communications having a second service configuration. In some cases, the first aggregation level is a fixed aggregation level based on a payload size of the DCI format. In some cases, identifying that the PDCCH includes the data communications includes determining a first error checking encoding length of the DCI format including the DCI payload that is different from a second error checking encoding length associated with a different DCI format for different data communications having a second service configuration. In some cases, the different data communications having the second service configuration have a delay tolerance above a threshold level associated with the first service configuration.

Data communications component 635 may receive the data communications within the PDCCH. In some cases, data communications component 635 may receive the data communications in downlink resources based on a received indication. In some cases, receiving the data communications includes receiving the data communications within contents of the DCI payload.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
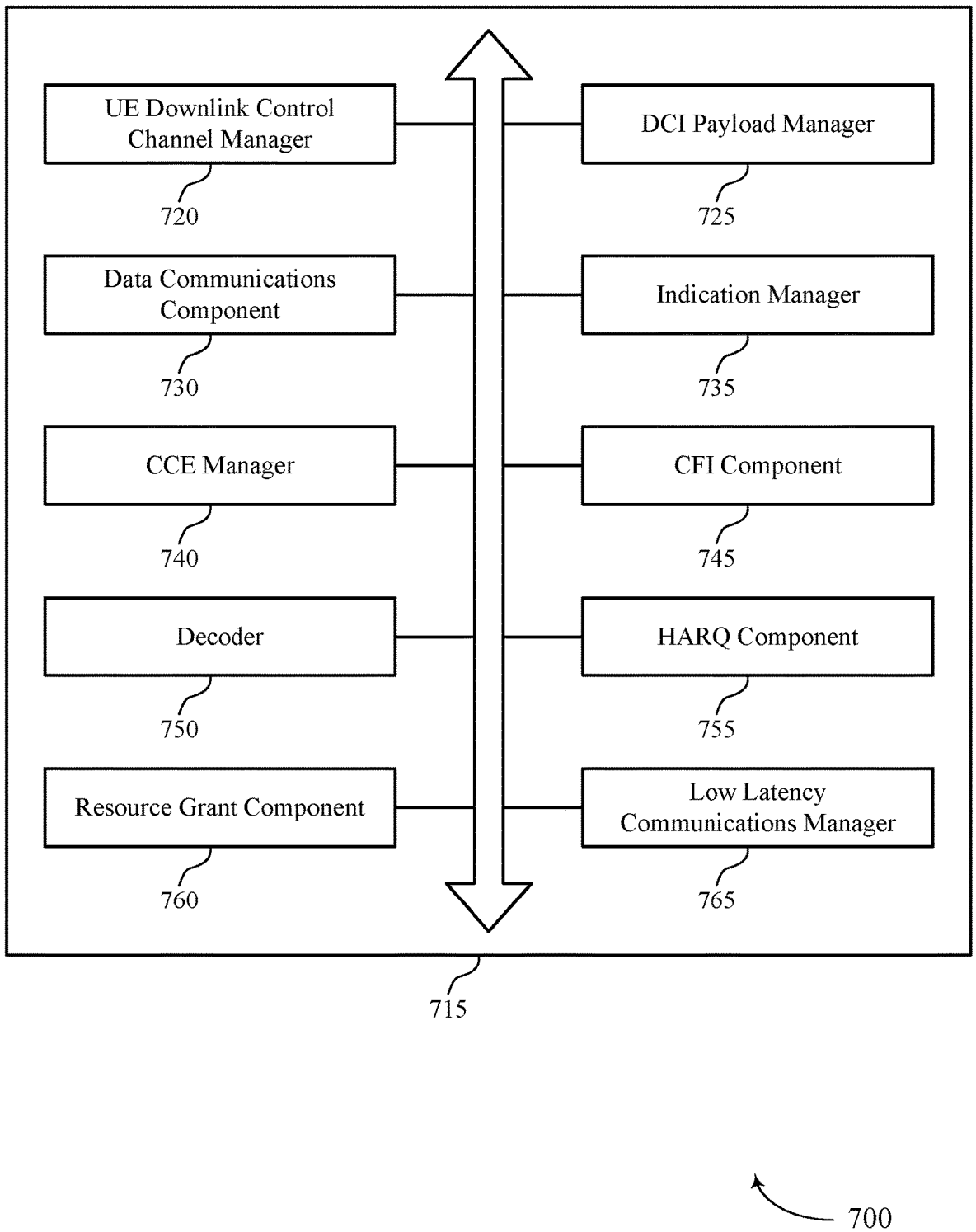

FIG. 7 shows a block diagram 700 of a UE communications manager 715 that supports data transmission in a PDCCH in accordance with aspects of the present disclosure. The UE communications manager 715 may be an example of aspects of a UE communications manager 515, a UE communications manager 615, or a UE communications manager 815 described with reference to FIGS. 5, 6, and 8. The UE communications manager 715 may include UE downlink control channel manager 720, DCI payload manager 725, data communications component 730, indication manager 735, CCE manager 740, CFI component 745, decoder 750, HARQ component 755, resource grant component 760, and low latency communications manager 765. Each of these modules may communicate, directly or indirectly, with one another (e.g., via one or more buses).

UE downlink control channel manager 720 may receive a PDCCH of a downlink TTI, identify the PDCCH based on the CFI, and determine a duration of the downlink TTI. DCI payload manager 725 may identify, via a DCI payload of the PDCCH, that the PDCCH includes data communications having a first service configuration. In some cases, data communications having the first service configuration may include data communications with a delay tolerance below a threshold level. In some examples, DCI payload manager 725 may identify DCI payload parameters including at least a DCI payload aggregation level, a DCI payload size, or both. In some cases, DCI payload manager 725 may determine a starting location of the search space including the DCI payload based on a UE-specific RNTI.

In some cases, DCI payload manager 725 may identify that the PDCCH includes the data communications based on a first DCI size, or may identify that the PDCCH includes the data communications based on a first error checking encoding length. Additionally or alternative, DCI payload manager 725 may determine a first aggregation level for a DCI format including the DCI payload that is different from a second aggregation level associated with a different DCI format for different data communications having a second service configuration, where receiving data communications is based on the determined first aggregation level. In some examples, DCI payload manager 725 may determine a payload size of the DCI format including the DCI payload.

In some examples, identifying that the PDCCH includes the data communications may include determining a first DCI size of the DCI format including the DCI payload that is different from a second DCI size associated with a different DCI format for different data communications having a second service configuration. Additionally or alternatively, identifying that the PDCCH includes the data communications may include identifying a UE-specific RNTI associated with a search space for the DCI format including the DCI payload, the UE-specific RNTI being different from a second RNTI associated with a search space for a different DCI format for different data communications having a second service configuration. In some cases, the first aggregation level is a fixed aggregation level based on a payload size of the DCI format. In some cases, identifying that the PDCCH includes the data communications includes determining a first error checking encoding length of the DCI format including the DCI payload that is different from a second error checking encoding length associated with a different DCI format for different data communications having a second service configuration. In some cases, the different data communications having the second service configuration have a delay tolerance above a threshold level associated with the first service configuration.

Data communications component 730 may receive the data communications within the PDCCH. In some cases, data communications component 730 may receive the data communications in downlink resources based on a received indication. In some cases, receiving the data communications includes receiving the data communications within contents of the DCI payload.

Indication manager 735 may receive an indication of a set of CCEs for receiving the data communications and receive an indicator bit identifying the DCI payload as a DCI payload that includes an indication of downlink resources for the data communications within the PDCCH. In some cases, receiving the data communications includes receiving, as part of a bit field of the DCI payload, an indication of downlink resources within the PDCCH on which the data communications are to be received.

CCE manager 740 may identify a set of CCEGs and receive an indication of a set of CCEs of the CCEGs for receiving the data communications. CFI component 745 may identify a CFI for a set of TTIs that includes the downlink TTI. Decoder 750 may decode the data communications based on the determined payload size and an aggregation level of the DCI format including the DCI payload. Additionally or alternatively, decoder 750 may perform a blind decoding of the data communications based on a set of payload sizes and aggregation levels of a DCI format including the DCI payload.

HARQ component 755 may identify an index of the downlink TTI based on synchronous downlink transmissions, synchronous uplink transmissions, or both and determine a HARQ ID, an RV, an NDI, or any combination thereof based on the identified index. In some examples, HARQ component 755 may identify that the data communications are included in a periodic transmission, the downlink TTI being associated with an initial transmission of the data communications, determine a HARQ process ID for the initial transmission based on an index of the downlink TTI, and identify an uplink TTI, where a timing of the uplink TTI is based on receiving the data communications in the PDCCH of the downlink TTI. In such cases, HARQ component 755 may transmit HARQ feedback using the uplink TTI. In some examples, HARQ component 755 may receive, as part of the DCI payload, an indication of a dynamic HARQ feedback timing for the data communications.

Resource grant component 760 may receive, within the PDCCH of the downlink TTI, a resource grant for uplink data communications with having an uplink service configuration and receive a RRC message including an indication of whether to monitor resources for URLLC or resources for ULL. In some cases, the uplink data communications may with an uplink service configuration may have a delay tolerance below a threshold level. Low latency communications manager 765 may identify a first RNTI and a second RNTI, the first RNTI being associated with an URLLC and the second RNTI being associated with an ULL downlink control channel. In some cases, low latency communications manager 765 may identify the downlink TTI as a URLLC resource or a ULL resource based on the identified first RNTI or second RNTI, identify the downlink TTI as a URLLC resource or a ULL resource based on the indication, or identify the downlink TTI as a URLLC resource or a ULL resource based on the duration of the downlink TTI, or a combination thereof. Additionally or alternatively, low latency communications manager 765 may identify the downlink TTI as a URLLC resource or a ULL resource based on the DCI payload parameters.

Figure 8:
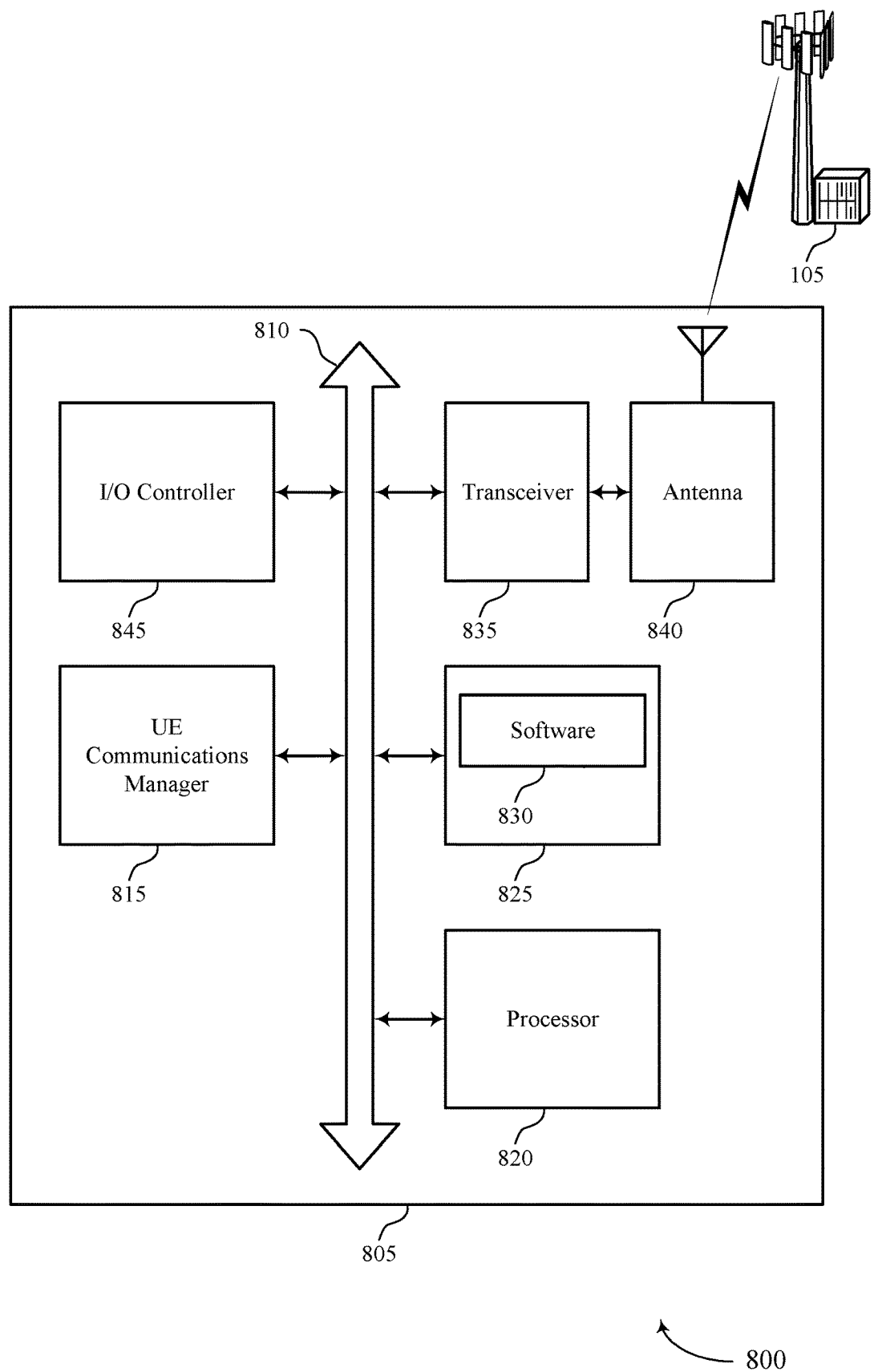
FIG. 8 illustrates a block diagram of a system including a user equipment (UE) that supports data transmission in a PDCCH in accordance with aspects of the present disclosure.

FIG. 8 shows a diagram of a system 800 including a device 805 that supports data transmission in a PDCCH in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting data transmission in a PDCCH for data communications with a delay tolerance below a threshold level).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support data transmission in a PDCCH for data communications having a first service configuration. In some cases, data communications having the first service configuration may include data communications with a delay tolerance below a threshold level. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas. In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
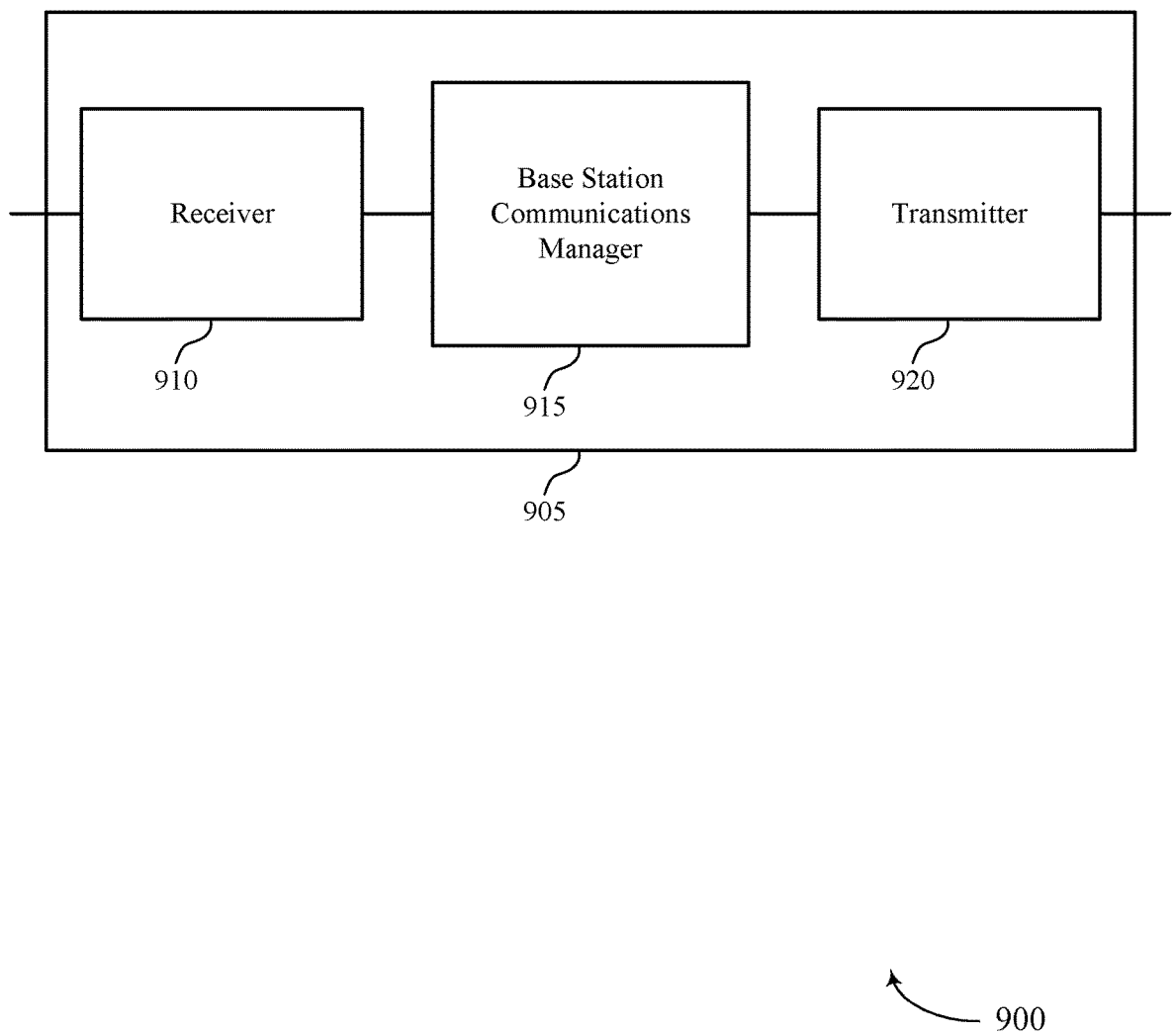
FIGS. 9 through 11 show block diagrams of a device that supports data transmission in a PDCCH in accordance with aspects of the present disclosure.

FIG. 9 shows a block diagram 900 of a wireless device 905 that supports data transmission in a PDCCH in accordance with aspects of the present disclosure. Wireless device 905 may be an example of aspects of a base station 105 as described herein. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to data transmission in a PDCCH for data communications with a delay tolerance below a threshold level, etc.). Information may be passed on to other components of the device. The receiver 910 may be an example of aspects of the transceiver 1235 described with reference to FIG. 12. The receiver 910 may utilize a single antenna or a set of antennas.

Base station communications manager 915 may be an example of aspects of the base station communications manager 1215 described with reference to FIG. 12. Base station communications manager 915 and/or at least some of its various sub-components may be implemented in hardware, software executed by a processor, firmware, or any combination thereof. If implemented in software executed by a processor, the functions of the base station communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915 and/or at least some of its various sub-components may be physically located at various positions, including being distributed such that portions of functions are implemented at different physical locations by one or more physical devices. In some examples, base station communications manager 915 and/or at least some of its various sub-components may be a separate and distinct component in accordance with various aspects of the present disclosure. In other examples, base station communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 915 may transmit a DCI payload within a PDCCH of a downlink TTI and transmit data communications having a first service configuration in the PDCCH, the DCI payload being indicative that the data communications are included in the PDCCH.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
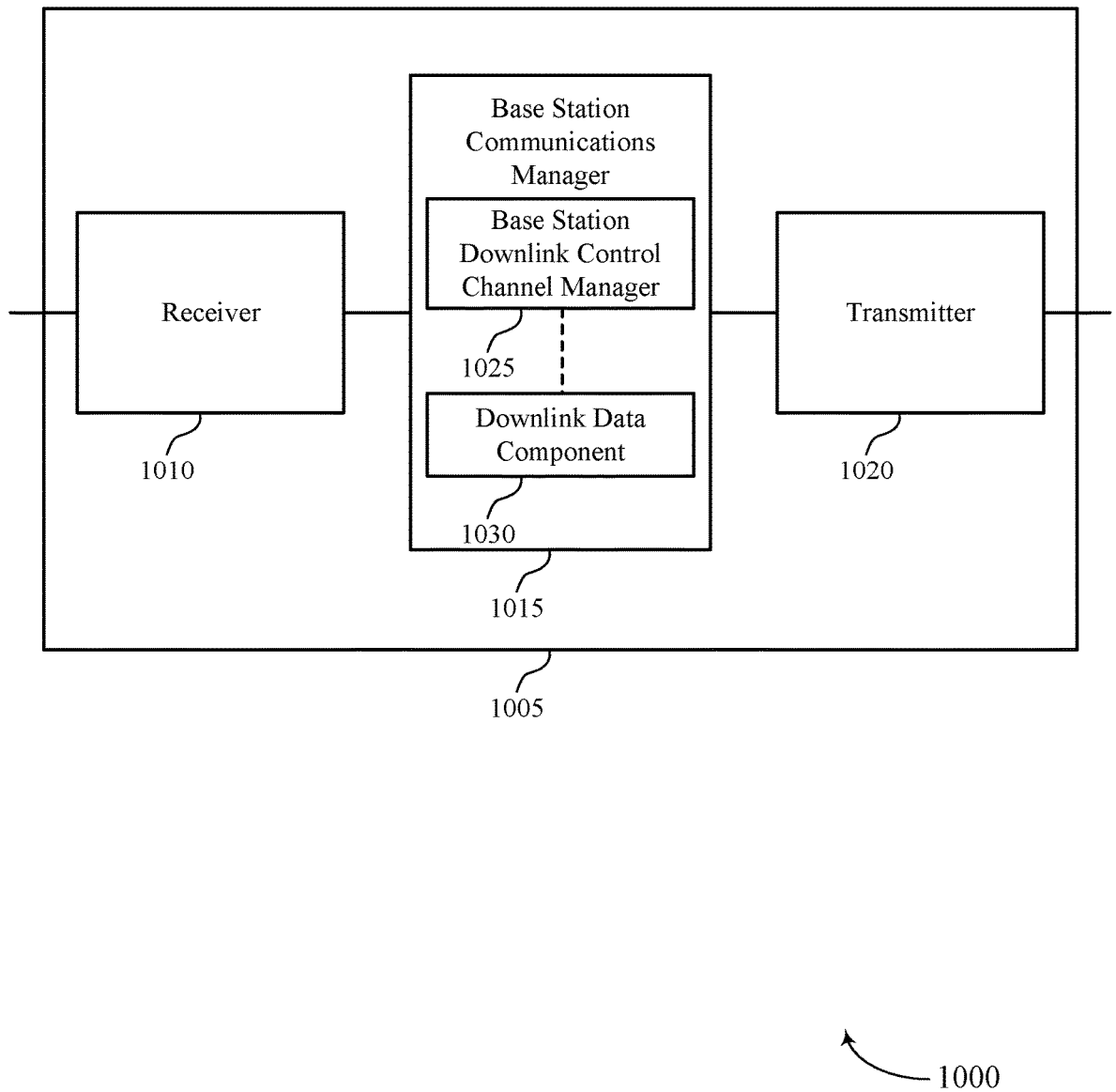

FIG. 10 shows a block diagram 1000 of a wireless device 1005 that supports data transmission in a PDCCH in accordance with aspects of the present disclosure. Wireless device 1005 may be an example of aspects of a wireless device 905 or a base station 105 as described with reference to FIG. 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to data transmission in a PDCCH for data communications with a delay tolerance below a threshold level, etc.). Information may be passed on to other components of the device. The receiver 1010 may be an example of aspects of the transceiver 1235 described with reference to FIG. 12. The receiver 1010 may utilize a single antenna or a set of antennas.

Base station communications manager 1015 may be an example of aspects of the base station communications manager 1215 described with reference to FIG. 12. Base station communications manager 1015 may also include base station downlink control channel manager 1025 and downlink data component 1030.

Base station downlink control channel manager 1025 may transmit a DCI payload within a PDCCH of a downlink TTI. Downlink data component 1030 may transmit data communications having a first service configuration in the PDCCH, the DCI payload being indicative that the data communications are included in the PDCCH. In some cases, data communications having the first service configuration may include data communications with a delay tolerance below a threshold level. In some examples, downlink data component 1030 may transmit the data communications in the downlink resources based on a transmitted indication, or may transmit the DCI payload within a UE-specific search space. In some cases, downlink data component 1030 may transmit an indicator bit identifying a DCI format including the DCI payload as a DCI format that includes an indication of downlink resources for the data communications within the PDCCH.

In some cases, transmitting the data communications includes transmitting the data communications within the DCI payload. Additionally or alternatively, transmitting the data communications includes transmitting, as part of a bit field of the DCI payload, an indication of downlink resources within the PDCCH on which the data communications are to be transmitted. In some examples, transmitting the DCI payload includes determining a first error checking encoding length for a DCI format including the DCI payload that is different from a second error checking encoding length associated with a different DCI format for different data communications having a second service configuration.

In some cases, the different data communications having the second service configuration have a delay tolerance above a threshold level associated with the first service configuration.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
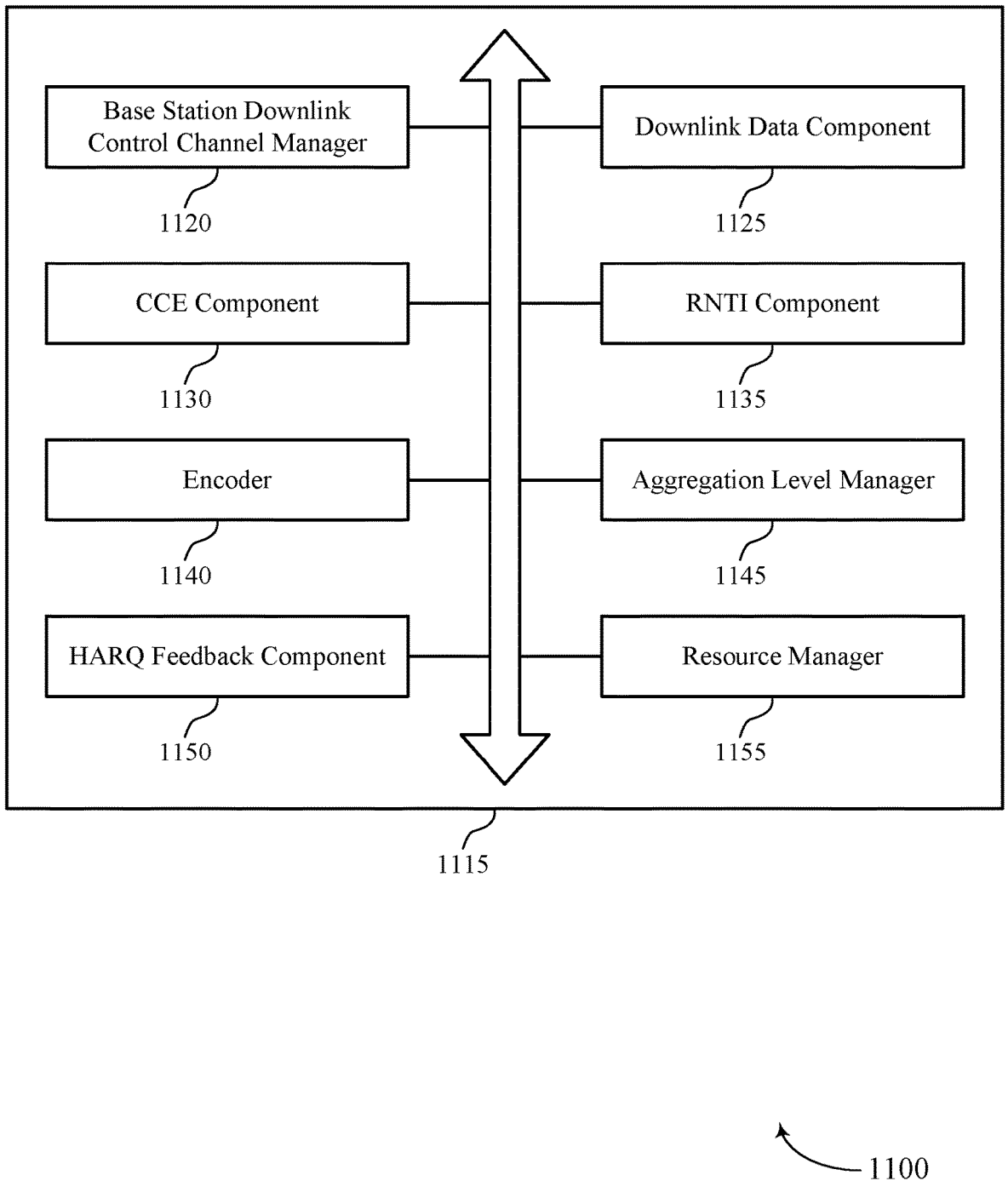

FIG. 11 shows a block diagram 1100 of a base station communications manager 1115 that supports data transmission in a PDCCH in accordance with aspects of the present disclosure. The base station communications manager 1115 may be an example of aspects of a base station communications manager 1215 described with reference to FIGS. 9, 10, and 12. The base station communications manager 1115 may include base station downlink control channel manager 1120, downlink data component 1125, CCE component 1130, RNTI component 1135, encoder 1140, aggregation level manager 1145, HARQ feedback component 1150, and resource manager 1155. Each of these modules may communicate, directly or indirectly, with one another (e.g., via one or more buses).

Base station downlink control channel manager 1120 may transmit a DCI payload within a PDCCH of a downlink TTI. Downlink data component 1125 may transmit data communications having a first service configuration in the PDCCH, the DCI payload being indicative that the data communications are included in the PDCCH. In some cases, data communications having the first service configuration may include data communications with a delay tolerance below a threshold level. In some examples, downlink data component 1125 may transmit the data communications in the downlink resources based on a transmitted indication, or may transmit the DCI payload within a UE-specific search space. In some cases, downlink data component 1125 may transmit an indicator bit identifying a DCI format including the DCI payload as a DCI format that includes an indication of downlink resources for the data communications within the PDCCH.

In some cases, transmitting the data communications includes transmitting the data communications within the DCI payload. Additionally or alternatively, transmitting the data communications includes transmitting, as part of a bit field of the DCI payload, an indication of downlink resources within the PDCCH on which the data communications are to be transmitted. In some examples, transmitting the DCI payload includes determining a first error checking encoding length for a DCI format including the DCI payload that is different from a second error checking encoding length associated with a different DCI format for different data communications having a second service configuration. In some cases, the different data communications having the second service configuration have a delay tolerance above a threshold level associated with the first service configuration.

CCE component 1130 may transmit an indication of a set of CCEs for receiving the data communications. In some cases, CCE component 1130 may identify a set of CCEGs and transmit an indication of a set of CCEs of the CCEGs used for transmitting the data communications. RNTI component 1135 may determine a UE-specific RNTI corresponding to a DCI format including the DCI payload, the UE-specific RNTI being different from a second RNTI associated with a different DCI format for different data communications having a second service configuration.

Encoder 1140 may encode a DCI format including the DCI payload based on the determined first error checking encoding length. Aggregation level manager 1145 may determine a first aggregation level for a DCI format including the DCI payload that is different from a second aggregation level associated with a different DCI format for different data communications having a second service configuration, where the data communications are transmitted based on the determined first aggregation level. In some cases, the first aggregation level is a fixed aggregation level based on a payload size of the DCI format.

HARQ feedback component 1150 may receive HARQ feedback based on transmitting the data communications in the PDCCH, where the a HARQ process ID and RV are based on an index of the downlink TTI. Resource manager 1155 may transmit, within the PDCCH of the downlink TTI, a resource grant for uplink data communications with an additional delay tolerance below the threshold level and transmit a RRC message including an indication of whether to monitor resources for URLLC or resources for ULL.

Figure 12:
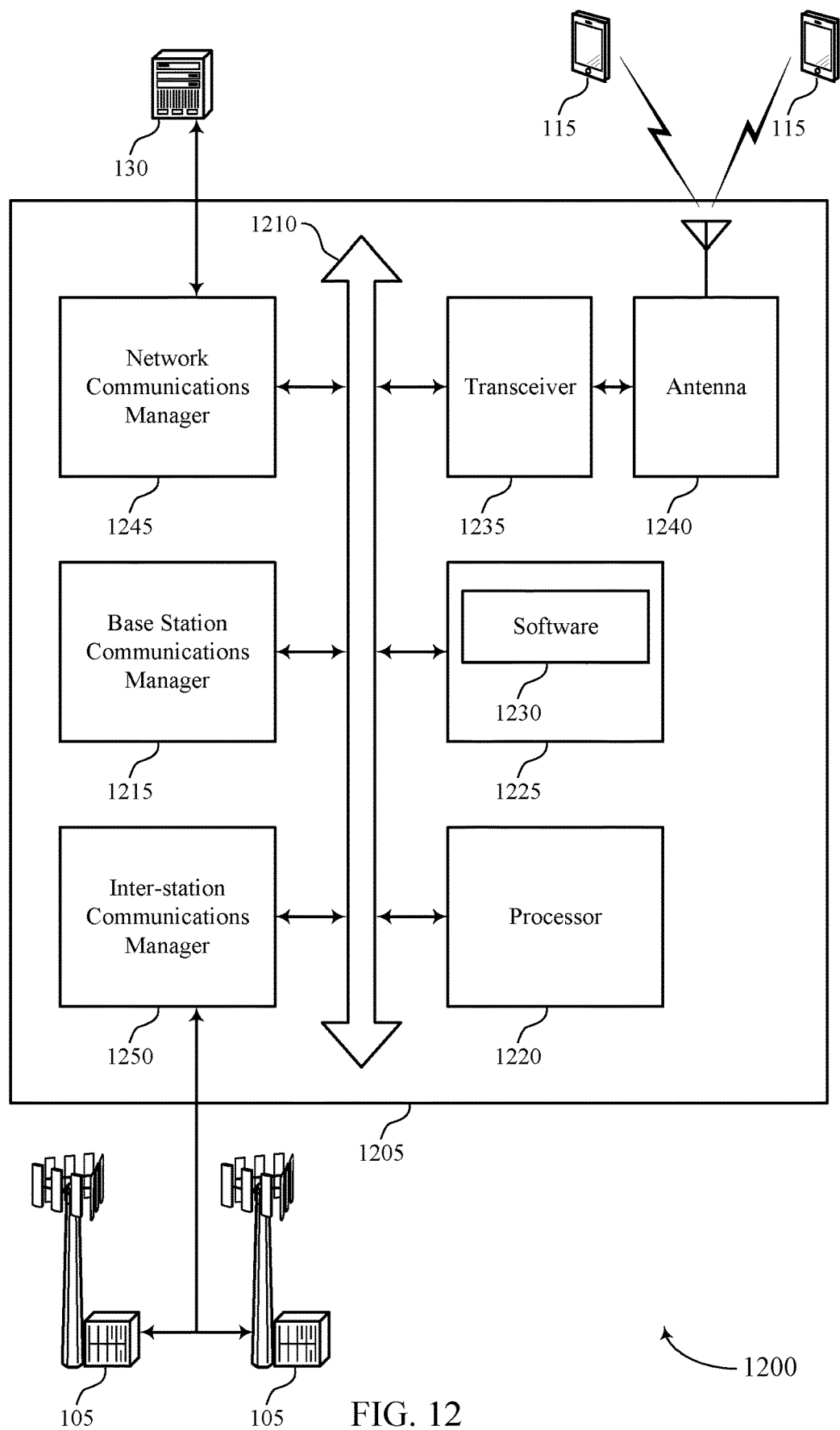
FIG. 12 illustrates a block diagram of a system including a base station that supports data transmission in a PDCCH in accordance with aspects of the present disclosure.

FIG. 12 shows a diagram of a system 1200 including a device 1205 that supports data transmission in a PDCCH in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station communications manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting data transmission in a PDCCH for data communications with a delay tolerance below a threshold level).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support data transmission in a PDCCH for data communications having a first service configuration. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an LTE/LTE-A wireless communication network technology to provide communication between base stations 105.

Figure 13:
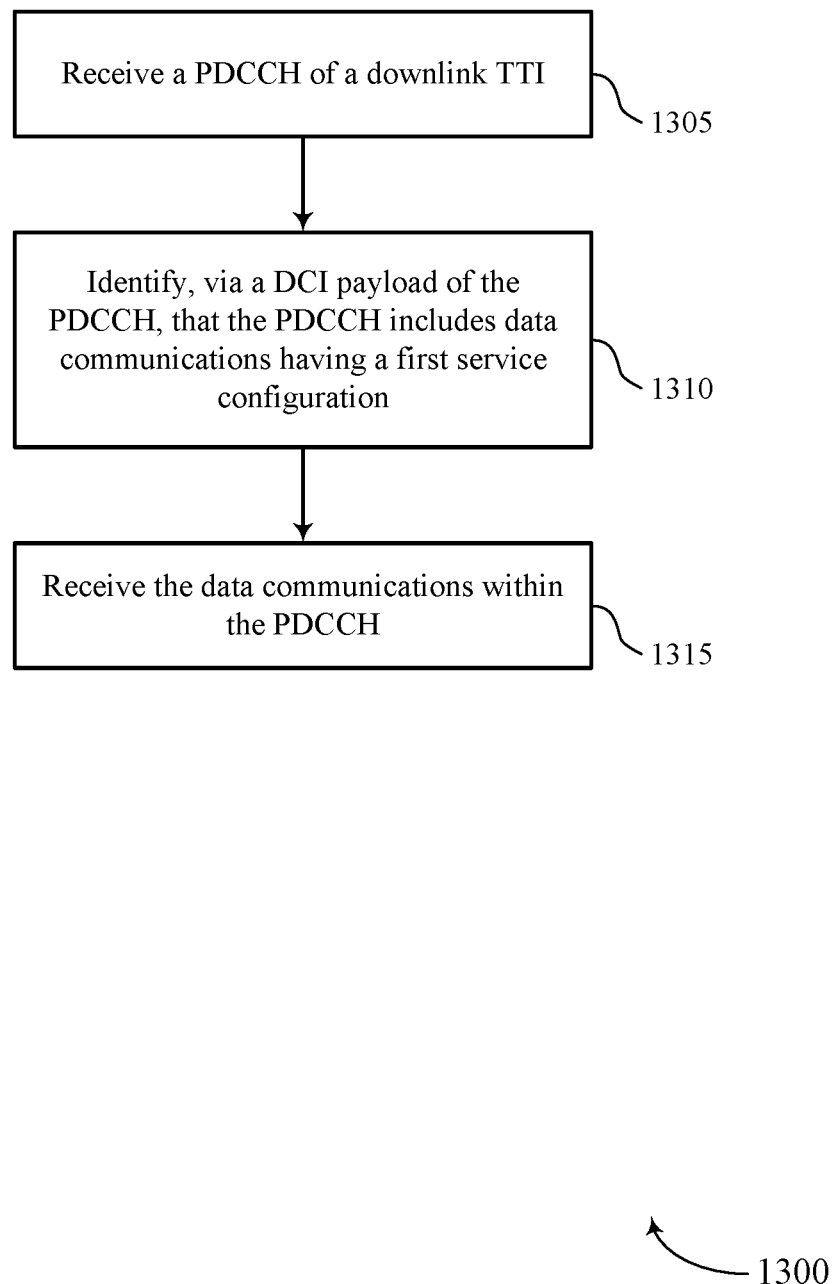
FIGS. 13 through 18 illustrate methods for data transmission in a PDCCH in accordance with aspects of the present disclosure.

FIG. 13 shows a flowchart illustrating a method 1300 for data transmission in a PDCCH in accordance with aspects of the present disclosure. The operations of method 1300 may be implemented by a UE 115 or its components as described herein. For example, the operations of method 1300 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may receive a PDCCH of a downlink TTI. The operations of 1305 may be performed according to the methods described herein. In certain examples, aspects of the operations of 1305 may be performed by a UE downlink control channel manager as described with reference to FIGS. 5 through 8.

At 1310 the UE 115 may identify, via a DCI payload of the PDCCH, that the PDCCH includes data communications having a first service configuration. The operations of 1310 may be performed according to the methods described herein. In certain examples, aspects of the operations of 1310 may be performed by a DCI payload manager as described with reference to FIGS. 5 through 8.

At 1315 the UE 115 may receive the data communications within the PDCCH. The operations of 1315 may be performed according to the methods described herein. In certain examples, aspects of the operations of 1315 may be performed by a data communications component as described with reference to FIGS. 5 through 8.

Figure 14:
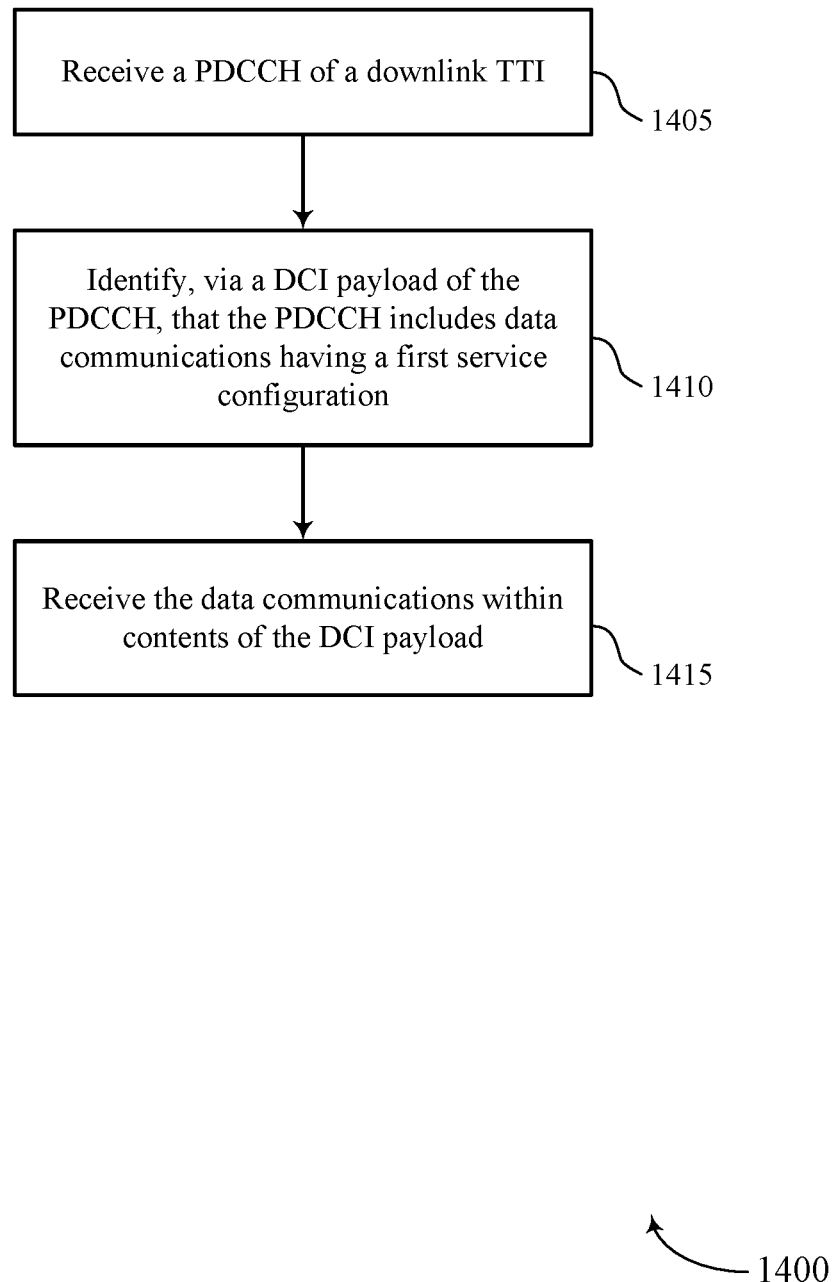

FIG. 14 shows a flowchart illustrating a method 1400 for data transmission in a PDCCH in accordance with aspects of the present disclosure. The operations of method 1400 may be implemented by a UE 115 or its components as described herein. For example, the operations of method 1400 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive a PDCCH of a downlink TTI. The operations of 1405 may be performed according to the methods described herein. In certain examples, aspects of the operations of 1405 may be performed by a UE downlink control channel manager as described with reference to FIGS. 5 through 8.

At 1410 the UE 115 may identify, via a DCI payload of the PDCCH, that the PDCCH includes data communications having a first service configuration. The operations of 1410 may be performed according to the methods described herein. In certain examples, aspects of the operations of 1410 may be performed by a DCI payload manager as described with reference to FIGS. 5 through 8.

At 1415 the UE 115 may receive the data communications within contents of the DCI payload. The operations of 1415 may be performed according to the methods described herein. In certain examples, aspects of the operations of 1415 may be performed by a data communications component as described with reference to FIGS. 5 through 8.

Figure 15:
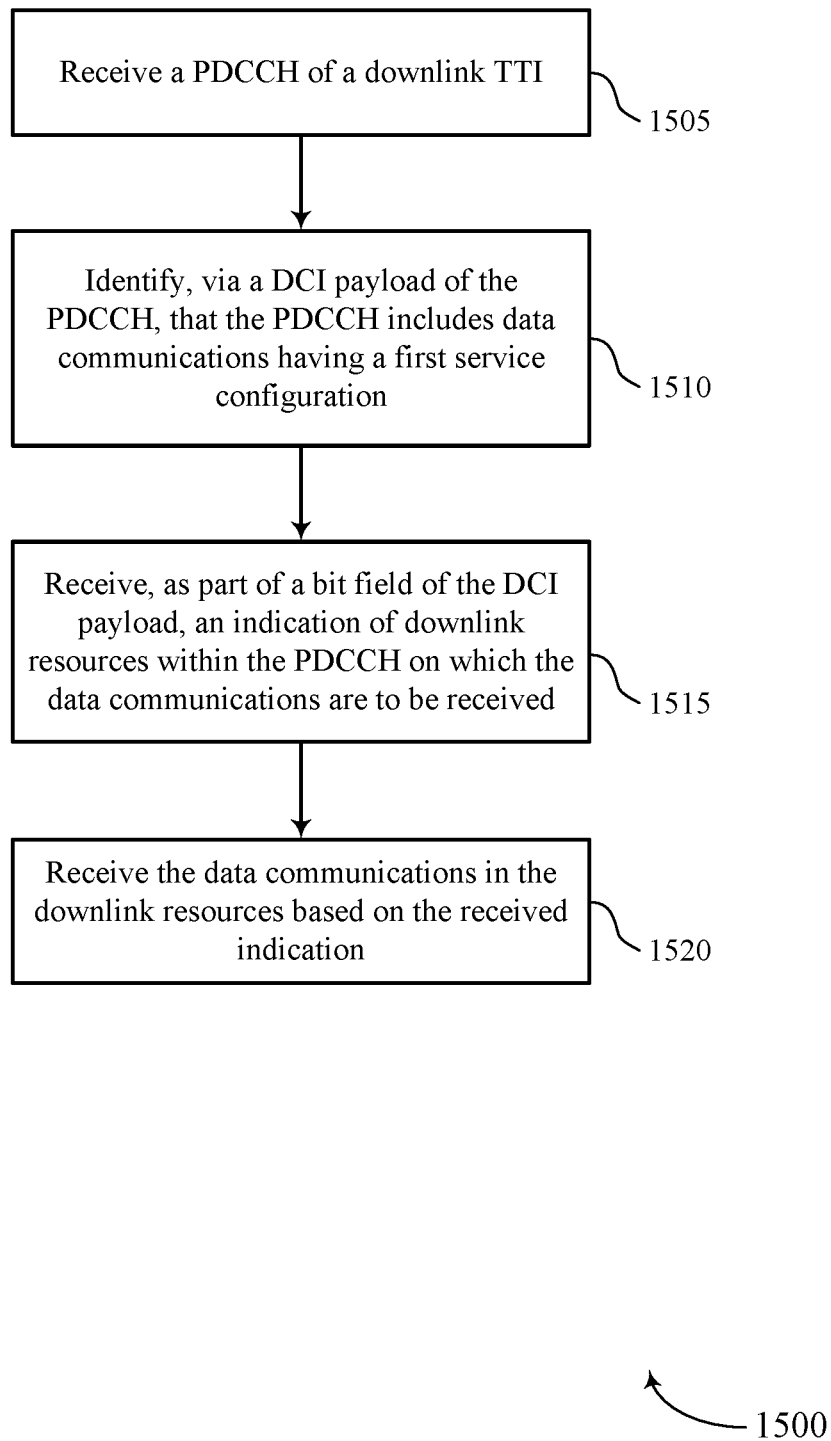

FIG. 15 shows a flowchart illustrating a method 1500 for data transmission in a PDCCH in accordance with aspects of the present disclosure. The operations of method 1500 may be implemented by a UE 115 or its components as described herein. For example, the operations of method 1500 may be performed by a UE communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive a PDCCH of a downlink TTI. The operations of 1505 may be performed according to the methods described herein. In certain examples, aspects of the operations of 1505 may be performed by a UE downlink control channel manager as described with reference to FIGS. 5 through 8.

At 1510 the UE 115 may identify, via a DCI payload of the PDCCH, that the PDCCH includes data communications having a first service configuration. For example, the UE 115 may identify the data communications within the PDCCH based on the first service configuration. The operations of 1510 may be performed according to the methods described herein. In certain examples, aspects of the operations of 1510 may be performed by a DCI payload manager as described with reference to FIGS. 5 through 8.

At 1515 the UE 115 may receive, as part of a bit field of the DCI payload, an indication of downlink resources within the PDCCH on which the data communications are to be received. The operations of 1515 may be performed according to the methods described herein. In certain examples, aspects of the operations of 1515 may be performed by a data communications component as described with reference to FIGS. 5 through 8.

At 1520 the UE 115 may receive the data communications in the downlink resources based on the received indication. The operations of 1520 may be performed according to the methods described herein. In certain examples, aspects of the operations of 1520 may be performed by a data communications component as described with reference to FIGS. 5 through 8.

Figure 16:
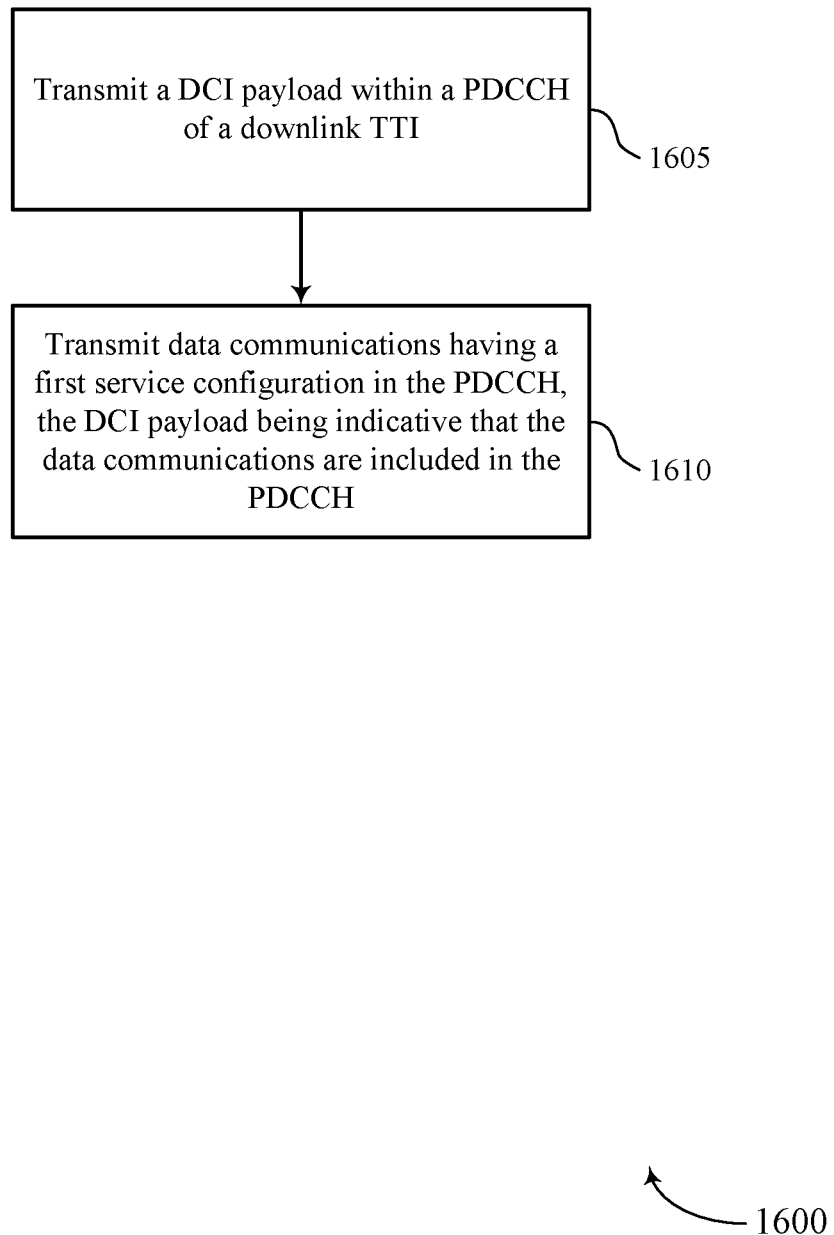

FIG. 16 shows a flowchart illustrating a method 1600 for data transmission in a PDCCH in accordance with aspects of the present disclosure. The operations of method 1600 may be implemented by a base station 105 or its components as described herein. For example, the operations of method 1600 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may transmit a DCI payload within a PDCCH of a downlink TTI. The operations of 1605 may be performed according to the methods described herein. In certain examples, aspects of the operations of 1605 may be performed by a base station downlink control channel manager as described with reference to FIGS. 9 through 12.

At 1610 the base station 105 may transmit data communications having a first service configuration in the PDCCH, the DCI payload being indicative that the data communications are included in the PDCCH. The operations of 1610 may be performed according to the methods described herein. In certain examples, aspects of the operations of 1610 may be performed by a downlink data component as described with reference to FIGS. 9 through 12.

Figure 17:
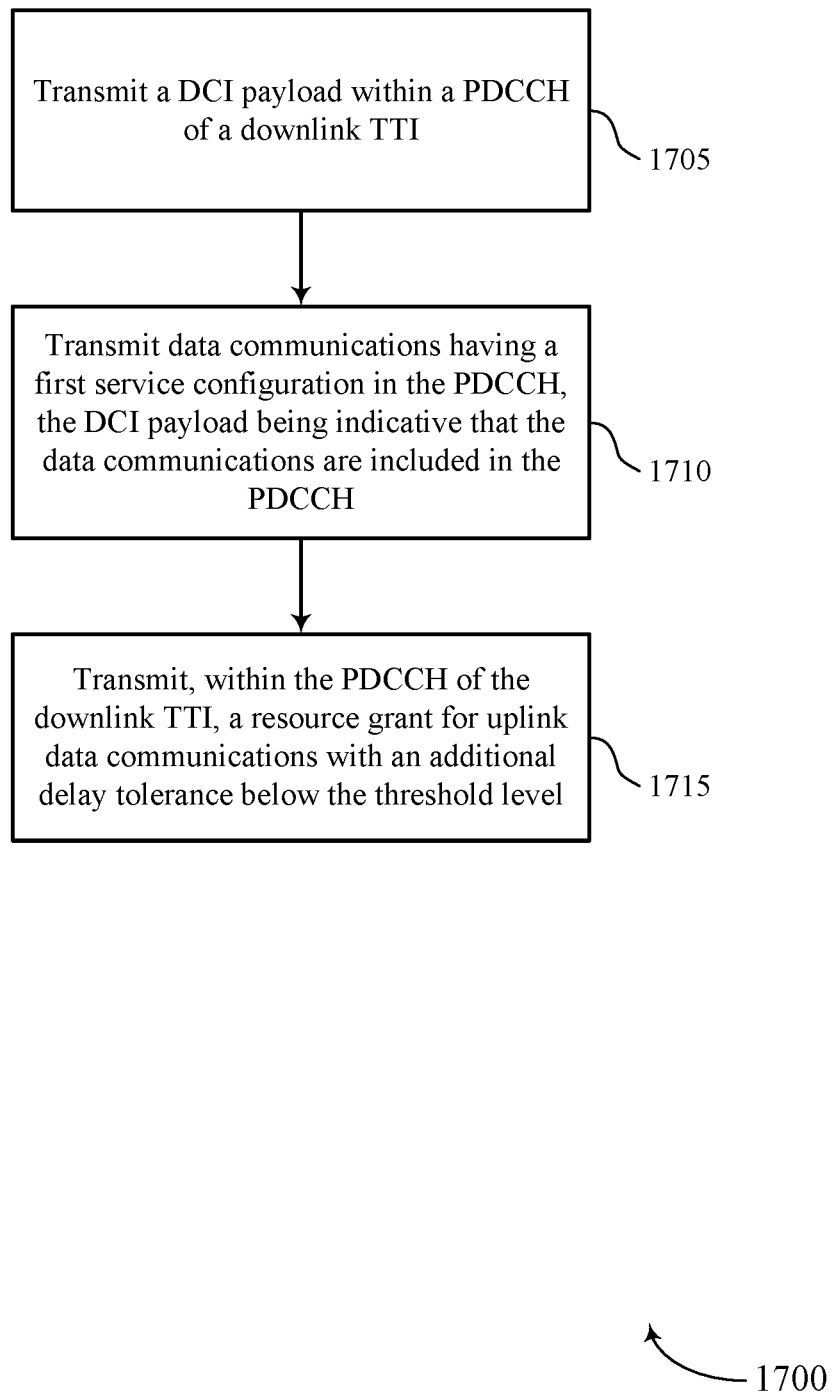

FIG. 17 shows a flowchart illustrating a method 1700 for data transmission in a PDCCH in accordance with aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may transmit a DCI payload within a PDCCH of a downlink TTI. The operations of 1705 may be performed according to the methods described herein. In certain examples, aspects of the operations of 1705 may be performed by a base station downlink control channel manager as described with reference to FIGS. 9 through 12.

At 1710 the base station 105 may transmit data communications having a first service configuration in the PDCCH, the DCI payload being indicative that the data communications are included in the PDCCH. The operations of 1710 may be performed according to the methods described herein. In certain examples, aspects of the operations of 1710 may be performed by a downlink data component as described with reference to FIGS. 9 through 12.

At 1715 the base station 105 may transmit, within the PDCCH of the downlink TTI, a resource grant for uplink data communications having an uplink service configuration. The operations of 1715 may be performed according to the methods described herein. In certain examples, aspects of the operations of 1715 may be performed by a resource manager as described with reference to FIGS. 9 through 12.

Figure 18:
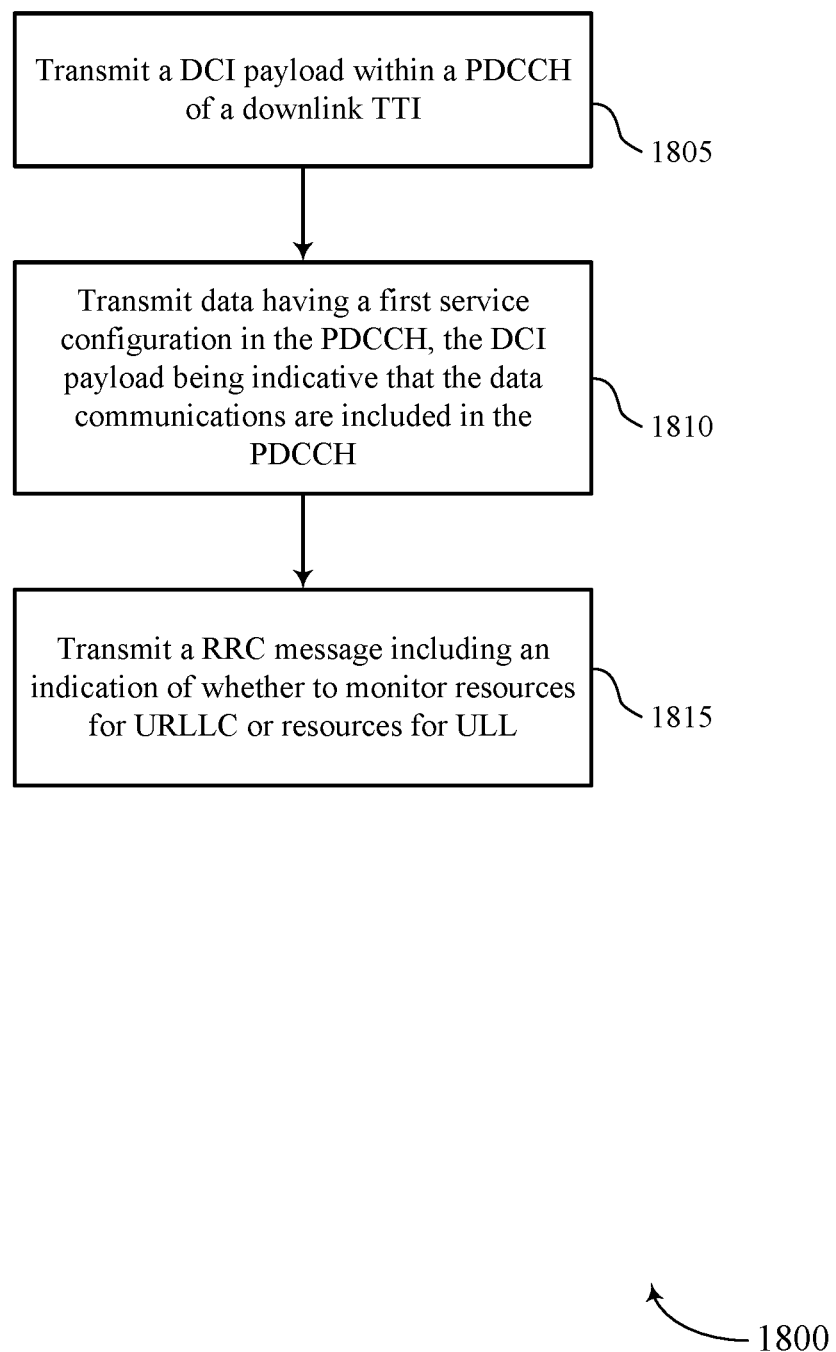

FIG. 18 shows a flowchart illustrating a method 1800 for data transmission in a PDCCH in accordance with aspects of the present disclosure. The operations of method 1800 may be implemented by a base station 105 or its components as described herein. For example, the operations of method 1800 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may transmit a DCI payload within a PDCCH of a downlink TTI. The operations of 1805 may be performed according to the methods described herein. In certain examples, aspects of the operations of 1805 may be performed by a base station downlink control channel manager as described with reference to FIGS. 9 through 12.

At 1810 the base station 105 may transmit data communications having a first service configuration in the PDCCH, the DCI payload being indicative that the data communications are included in the PDCCH. The operations of 1810 may be performed according to the methods described herein. In certain examples, aspects of the operations of 1810 may be performed by a downlink data component as described with reference to FIGS. 9 through 12.

At 1815 the base station 105 may transmit an RRC message including an indication of whether to monitor resources for ultra-reliable low latency communications URLLC or resources for ULL. The operations of 1815 may be performed according to the methods described herein. In certain examples, aspects of the operations of 1815 may be performed by a resource manager as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving a physical downlink control channel (PDCCH) of a downlink transmission time interval (TTI);
   identifying, via a downlink control information (DCI) payload of the PDCCH, that the PDCCH includes data communications having a first service configuration; and
   receiving the data communications within the PDCCH, including:
      receiving, as part of a bit field of the DCI payload, an indication of downlink resources within the PDCCH on which the data communications are to be received, and
      receiving the data communications in the downlink resources based on the received indication.

2. The method of claim 1, further comprising:
   receiving an indication of a set of control channel elements (CCEs) for receiving the data communications.

3. The method of claim 1, further comprising:
   identifying a set of control channel element (CCE) groups (CCEGs); and
   receiving an indication of a set of CCEs of the CCEGs for receiving the data communications.

4. The method of claim 1, further comprising:
   identifying an index of the downlink TTI based at least in part on synchronous downlink transmissions, synchronous uplink transmissions, or both; and
   determining a hybrid automatic repeat request (HARQ) process identifier (ID), a redundancy version (RV), a new data indicator (NDI), or any combination thereof based at least in part on the identified index.

5. The method of claim 1, further comprising:
   identifying that the data communications are included in a periodic transmission, the downlink TTI being associated with an initial transmission of the data communications; and
   determining a hybrid automatic repeat request (HARQ) process identifier (ID) and a redundancy version (RV) for the initial transmission based at least in part on an index of the downlink TTI.

6. The method of claim 1, wherein the data communications having the first service configuration comprise data communications with a delay tolerance below a threshold level.

7. The method of claim 1, further comprising:
   identifying a control format indicator (CFI) for a set of TTIs that includes the downlink TTI; and
   identifying the PDCCH based on the CFI.

8. The method of claim 1, wherein identifying that the PDCCH includes the data communications comprises:
   identifying a user equipment (UE)-specific radio network temporary identifier (RNTI) associated with a search space for a DCI format including the DCI payload, the UE-specific RNTI being different from a second RNTI associated with a search space for a different DCI format for different data communications having a second service configuration; and
   determining a starting location of the search space comprising the DCI payload based at least in part on the identified UE-specific RNTI.

9. The method of claim 8, wherein the different data communications having the second service configuration comprise data communications with a delay tolerance above a threshold level associated with the first service configuration.

10. The method of claim 1, wherein identifying that the PDCCH includes the data communications comprises:
    determining a first DCI size of a DCI format including the DCI payload that is different from a second DCI size associated with a different DCI format for different data communications having a second service configuration; and
    identifying that the PDCCH includes the data communications based at least in part on the determined first DCI size.

11. The method of claim 1, wherein identifying that the PDCCH includes the data communications comprises:
    determining a first error checking encoding length of a DCI format including the DCI payload that is different from a second error checking encoding length associated with a different DCI format for different data communications having a second service configuration; and identifying that the PDCCH includes the data communications based at least in part on the determined first error checking encoding length.

12. The method of claim 1, further comprising:
determining a first aggregation level for a DCI format including the DCI payload that is different from a second aggregation level associated with a different DCI format for different data communications having a second service configuration, wherein receiving the data communications is based at least in part on the determined first aggregation level.

13. The method of claim 12, wherein the first aggregation level is a fixed aggregation level based at least in part on a payload size of the DCI format.

14. The method of claim 1, further comprising:
determining a payload size of a DCI format including the DCI payload; and
decoding the data communications based at least in part on the determined payload size and an aggregation level of the DCI format.

15. The method of claim 1, further comprising:
performing a blind decoding of the PDCCH based at least in part on a plurality of payload sizes and aggregation levels of a DCI format including the DCI payload.

16. The method of claim 1, further comprising:
receiving an indicator bit identifying a DCI format including the DCI payload as a DCI format that includes an indication of downlink resources for the data communications within the PDCCH.

17. The method of claim 1, further comprising:
identifying an uplink TTI, wherein a timing of the uplink TTI is based at least in part on receiving the data communications in the PDCCH of the downlink TTI; and
transmitting hybrid automatic repeat request (HARQ) feedback using the uplink TTI.

18. The method of claim 1, further comprising:
receiving, within the PDCCH of the downlink TTI, a resource grant for uplink data communications having an uplink service configuration.

19. The method of claim 18, wherein the uplink data communications having an uplink service configuration comprise uplink data communications with a delay tolerance below a threshold level.

20. The method of claim 1, further comprising:
receiving a radio resource control (RRC) message comprising an indication of whether to monitor resources for ultra-reliable low latency communications (URLLC) or resources for ultra-low latency (ULL) resources.

21. The method of claim 1, further comprising:
identifying a first radio network temporary identifier (RNTI) and a second RNTI, the first RNTI being associated with an ultra-reliable low latency communications (URLLC) downlink control channel and the second RNTI being associated with an ultra-low latency (ULL) downlink control channel; and
identifying the downlink TTI as a URLLC resource or a ULL resource based on the identified first RNTI or second RNTI.

22. The method of claim 1, further comprising:
receiving, as part of the DCI payload, an indication of a dynamic hybrid automatic repeat request (HARQ) feedback timing for the data communications; and
identifying the downlink TTI as an ultra-reliable low latency communications (URLLC) resource or an ultra-low latency (ULL) resource based at least in part on the indication.

23. The method of claim 1, further comprising:
determining a duration of the downlink TTI; and
identifying the downlink TTI as an ultra-reliable low latency communications (URLLC) resource or an ultra-low latency (ULL) resource based at least in part on the duration of the downlink TTI.

24. The method of claim 1, further comprising:
identifying DCI payload parameters comprising at least a DCI payload aggregation level, a DCI payload size, or both; and
identifying the downlink TTI as an ultra-reliable low latency communications (URLLC) resource or an ultra-low latency (ULL) resource based at least in part on the DCI payload parameters.

25. A method for wireless communication, comprising:
transmitting a downlink control information (DCI) payload within a physical downlink control channel (PDCCH) of a downlink transmission time interval (TTI); and
transmitting data communications having a first service configuration in the PDCCH, wherein the DCI payload indicates that the data communications are included in the PDCCH, the transmitting including:
transmitting, as part of a bit field of the DCI payload, an indication of downlink resources within the PDCCH on which the data communications are to be transmitted, and
transmitting the data communications in the downlink resources based on the transmitted indication.

26. The method of claim 25, further comprising:
transmitting an indication of a set of control channel elements (CCEs) for receiving the data communications.

27. The method of claim 25, further comprising:
identifying a set of control channel element (CCE) groups (CCEGs); and
transmitting an indication of a set of CCEs of the CCEGs used for transmitting the data communications.

28. The method of claim 25, further comprising:
receiving hybrid automatic repeat request (HARQ) feedback based at least in part on transmitting the data communications in the PDCCH, wherein a HARQ process identifier (ID) and redundancy version (RV) are associated with an index of the downlink TTI.

29. The method of claim 25, wherein the data communications having the first service configuration comprise data communications with a delay tolerance below a threshold level.

30. The method of claim 25, wherein transmitting the DCI payload comprises:
determining a user equipment (UE)-specific radio network temporary identifier (RNTI) corresponding to a DCI format including the DCI payload, the UE-specific RNTI being different from a second RNTI associated with a different DCI format for different data communications having a second service configuration; and
transmitting the DCI payload within a UE-specific search space.

31. The method of claim 30, wherein the different data communications having the second service configuration comprise data communications with a delay tolerance above a threshold level associated with the first service configuration.

32. The method of claim 25, wherein transmitting the DCI payload comprises:
determining a first error checking encoding length for a DCI format including the DCI payload that is different from a second error checking encoding length associated with a different DCI format for different data communications having a second service configuration; and
the method further comprising encoding the DCI format based at least in part on the determined first error checking encoding length.

33. The method of claim 25, further comprising:
determining a first aggregation level for a DCI format including the DCI payload that is different from a second aggregation level associated with a different DCI format for different data communications having a second service configuration, wherein the data communications are transmitted based at least in part on the determined first aggregation level.

34. The method of claim 33, wherein the first aggregation level is a fixed aggregation level based at least in part on a payload size of the DCI format.

35. The method of claim 25, further comprising:
transmitting an indicator bit identifying a DCI format including the DCI payload as a DCI format that includes an indication of downlink resources for the data communications within the PDCCH.

36. The method of claim 25, further comprising:
transmitting, within the PDCCH of the downlink TTI, a resource grant for uplink data communications having an uplink service configuration.

37. The method of claim 36, wherein the uplink data communications having an uplink service configuration comprise uplink data communications with a delay tolerance below a threshold level.

38. The method of claim 25, further comprising:
transmitting a radio resource control (RRC) message comprising an indication of whether to monitor resources for ultra-reliable low latency communications (URLLC) or resources for ultra-low latency (ULL) resources.

39. An apparatus for wireless communication, comprising:
means for receiving a physical downlink control channel (PDCCH) of a downlink transmission time interval (TTI);
means for identifying, via a downlink control information (DCI) payload of the PDCCH, that the PDCCH includes data communications having a first service configuration; and
means for receiving the data communications within the PDCCH configured to:
receive, as part of a bit field of the DCI payload, an indication of downlink resources within the PDCCH on which the data communications are to be received, and
receive the data communications in the downlink resources based on the received indication.

40. An apparatus for wireless communication, comprising:
means for transmitting a downlink control information (DCI) payload within a physical downlink control channel (PDCCH) of a downlink transmission time interval (TTI); and
means for transmitting data communications having a first service configuration in the PDCCH, wherein the DCI payload indicates that the data communications are included in the PDCCH, the means for transmitting configured for:
transmitting, as part of a bit field of the DCI payload, an indication of downlink resources within the PDCCH on which the data communications are to be transmitted, and
transmitting the data communications in the downlink resources based on the transmitted indication.

41. An apparatus for wireless communication, comprising:
a processor,
memory coupled with the processor; and
instructions stored in the memory and executable by the processor to cause the apparatus to:
receive a physical downlink control channel (PDCCH) of a downlink transmission time interval (TTI);
identify, via a downlink control information (DCI) payload of the PDCCH, that the PDCCH includes data communications having a first service configuration; and
receive the data communications within the PDCCH, including instructions stored in the memory and executable by the processor to:
receive, as part of a bit field of the DCI payload, an indication of downlink resources within the PDCCH on which the data communications are to be received, and
receive the data communications in the downlink resources based on the received indication.

42. An apparatus for wireless communication, comprising:
a processor,
memory coupled with the processor; and
instructions stored in the memory and executable by the processor to cause the apparatus to:
transmit a downlink control information (DCI) payload within a physical downlink control channel (PDCCH) of a downlink transmission time interval (TTI); and
transmit data communications having a first service configuration in the PDCCH, wherein the DCI payload indicates that the data communications are included in the PDCCH, including instructions stored in the memory and executable by the processor to:
transmit, as part of a bit field of the DCI payload, an indication of downlink resources within the PDCCH on which the data communications are to be transmitted, and
transmit the data communications in the downlink resources based on the transmitted indication.

43. A non-transitory computer-readable medium storing code for wireless communication, the code comprising instructions executable by a processor to:
receive a physical downlink control channel (PDCCH) of a downlink transmission time interval (TTI);
identify, via a downlink control information (DCI) payload of the PDCCH, that the PDCCH includes data communications having a first service configuration; and
receive the data communications within the PDCCH, including instructions executable by the processor to:
receive, as part of a bit field of the DCI payload, an indication of downlink resources within the PDCCH on which the data communications are to be received, and receive the data communications in the downlink resources based on the received indication.

44. A non-transitory computer-readable medium storing code for wireless communication, the code comprising instructions executable by a processor to:

transmit a downlink control information (DCI) payload within a physical downlink control channel (PDCCH) of a downlink transmission time interval (TTI); and transmit data communications having a first service configuration in the PDCCH, wherein the DCI payload indicates that the data communications are included in the PDCCH, including instructions executable by the processor to:

transmit, as part of a bit field of the DCI payload, an indication of downlink resources within the PDCCH on which the data communications are to be transmitted, and transmit the data communications in the downlink resources based on the transmitted indication.

* * * * *